US012438257B2

(12) United States Patent
Zhou et al.

(10) Patent No.: US 12,438,257 B2
(45) Date of Patent: Oct. 7, 2025

(54) ELECTRONIC DEVICE

(71) Applicant: Huawei Technologies Co., Ltd., Shenzhen (CN)

(72) Inventors: Dawei Zhou, Shenzhen (CN); Hanyang Wang, Reading (GB); Xiaotao Cai, Shenzhen (CN); Wenlong Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 226 days.

(21) Appl. No.: 18/255,014

(22) PCT Filed: Nov. 30, 2021

(86) PCT No.: PCT/CN2021/134207

§ 371 (c)(1),
(2) Date: May 30, 2023

(87) PCT Pub. No.: WO2022/111716

PCT Pub. Date: Jun. 2, 2022

(65) Prior Publication Data

US 2024/0021974 A1 Jan. 18, 2024

(30) Foreign Application Priority Data

Nov. 30, 2020 (CN) ......................... 202011378857.9

(51) Int. Cl.

*H01Q 1/24* (2006.01)
*H01Q 1/38* (2006.01)
*H01Q 1/42* (2006.01)
*H01Q 21/30* (2006.01)

(52) U.S. Cl.

CPC ............... *H01Q 1/244* (2013.01); *H01Q 1/38* (2013.01); *H01Q 1/422* (2013.01); *H01Q 21/30* (2013.01)

(58) Field of Classification Search

CPC .......... H01Q 1/24; H01Q 1/243; H01Q 1/244; H01Q 1/422; H01Q 9/40; H01Q 9/42; H01Q 21/30

See application file for complete search history.

(56) References Cited

U.S. PATENT DOCUMENTS

2012/0044123 A1* 2/2012 Rothkopf ............... H01Q 1/243 343/878
2016/0093955 A1* 3/2016 Ayala Vazquez ...... H01Q 5/335 343/702
2017/0271765 A1* 9/2017 An ......................... H01Q 5/335
2020/0153088 A1* 5/2020 Hill ....................... G06F 1/1633

FOREIGN PATENT DOCUMENTS

CN 102436289 A 5/2012

* cited by examiner

*Primary Examiner* — Thai Pham
(74) *Attorney, Agent, or Firm* — Conley Rose, P.C.

(57) ABSTRACT

An electronic device includes an antenna structure. The electronic device includes a bezel and a dielectric layer. The bezel has a first position and a second position, and a bezel between the first position and the second position is configured as an antenna radiator. A first dielectric is disposed on at least a part of an inner surface of the bezel besides the bezel between the first position and the second position. A second dielectric is disposed on at least a part of a surface of the antenna radiator. The first dielectric is different from the second dielectric.

20 Claims, 25 Drawing Sheets

Electronic device 10

Original state

CRLH

Solution of this application

Solution of this application

Original state

Partial coverage of a radiator surface

Full coverage of a radiator surface

Original state

A first area is the third medium
with a high DK value

A radiator surface is covered with the third medium with a high DK value

Original state

Solution of this application

ELECTRONIC DEVICE

This is a National Stage of International Patent Application No. PCT/CN2021/134207, filed on Nov. 30, 2021, which claims priority to Chinese Patent Application No. 202011378857.9 filed on Nov. 30, 2020, both of which are hereby incorporated by reference in their entireties.

TECHNICAL FIELD

This application relates to the field of wireless communication, and in particular, to an electronic device.

BACKGROUND

Currently, an electronic device commonly uses a nano molding technology (nano molding technology, NMT)-based metal mechanical part as an exterior part. The NMT is a process of combination of metal and plastic by nanotechnology. The NMT is a process in which nanocrystallization processing is performed on a metal surface, and then plastic is molded on the metal surface through direct injection, so that the metal and the plastic can be integrally molded. This technology is configured to balance an appearance and texture of the metal, and enable a product to be lighter and thinner.

The metal exterior part may be divided into a plurality of parts through NMT injection molding. The electronic device can use some metal exterior parts as radiators of an antenna, so that more antenna units can be arranged for the electronic device.

SUMMARY

Embodiments of this application provide an electronic device, including an antenna structure. A secondary injection molding process is performed by using an NMT process to change dielectric parameters of a dielectric layer corresponding to a radiator of the antenna structure at different positions, so that an antenna radiation characteristic can be changed, and antenna radiation efficiency can be improved.

According to a first aspect, an electronic device is provided, including a bezel and a dielectric layer. The bezel has a first position and a second position, and a bezel between the first position and the second position is configured as an antenna radiator. A first dielectric is disposed on at least a part of an inner surface of the bezel besides the bezel between the first position and the second position. A second dielectric is disposed on at least a part of a surface of the antenna radiator. The first dielectric is different from the second dielectric.

According to the technical solution in this embodiment of this application, that dielectric constants or dissipation factors of the first dielectric and the second dielectric are different may be considered as that the dielectric constants or the dissipation factors are different, or both the dielectric constants and the dissipation factors are different. Selection may be performed according to actual production or design. This is not limited in this application. For example, a dielectric with a high DK value may be filled in a slot formed between an exciting element and a parasitic element of the antenna radiator, to improve coupling between resonance generated by the exciting element and resonance generated by the parasitic element, and improve antenna radiation efficiency. Alternatively, a dielectric with a high dielectric constant may be disposed on a side that is of the antenna radiator and that is away from a feed point, so that ground excitation becomes relatively more sufficient, to improve antenna radiation efficiency. Alternatively, a dielectric with a low DF value may be used in a dielectric layer region corresponding to the antenna radiator, to reduce a loss of a plastic particle of a dielectric, and improve antenna radiation efficiency.

With reference to the first aspect, in some implementations of the first aspect, a dielectric constant of the second dielectric is greater than a dielectric constant of the first dielectric. A first slot is provided at the first position of the bezel, and the first slot is filled with the second dielectric, so that the bezel is still configured as a complete mechanical part after the first slot is provided. The dielectric constant of the second dielectric in the first slot may be greater than that of the first dielectric, and therefore the second dielectric in the first slot may be equivalent to a distributed capacitor connected in parallel to the antenna radiator. A capacitance value of the distributed capacitor is related to the dielectric constant of the second dielectric.

According to the technical solution of this embodiment of this application, the second dielectric with a high dielectric constant is configured to fill a slot formed between a first radiator and the bezel, and the second dielectric filled in the slot may be equivalent to a distributed capacitor. When a frequency remains unchanged, a higher dielectric constant indicates a larger capacitance value of the formed distributed capacitor. After an antenna structure is filled with the dielectric with a high dielectric constant, improvement in radiation efficiency corresponding to the antenna structure may be understood as that ground excitation in the electronic device becomes relatively more sufficient, so that radiation efficiency of the antenna structure is improved. In addition, because the capacitance value of the equivalent distributed capacitor also depends on a width of the slot, an overlapping area of metal on two sides of the slot, and the like, dielectric constants of dielectrics in different antenna structures may vary greatly, and may be adjusted according to actual production or design. This is not limited in this application.

With reference to the first aspect, in some implementations of the first aspect, a second slot is provided at the second position of the bezel, the second slot is filled with the first dielectric, and the first dielectric in the second slot is configured to make the bezel provided with the second slot a complete mechanical part.

With reference to the first aspect, in some implementations of the first aspect, a dielectric constant of the second dielectric is less than a dielectric constant of the first dielectric. A first slot is provided at the first position of the bezel, and the first slot is filled with the second dielectric.

According to the technical solution in this embodiment of this application, in some cases, a dielectric with a lower dielectric constant may be filled in a corresponding part of the antenna mechanical part. This can also achieve a same technical effect.

With reference to the first aspect, in some implementations of the first aspect, the electronic device further includes a feed unit. A feed point is disposed on the antenna radiator, and the feed unit feeds the antenna radiator at the feed point. A distance between the feed point and the first position of the bezel is greater than a distance between the feed point and the second position of the bezel.

According to the technical solution in this embodiment of this application, if a position of the second dielectric is moved towards the feed point, radiation efficiency of the antenna structure is still higher than that in another conventional particle filling solution. However, compared with the conventional solution, the radiation efficiency is relatively reduced as the position of the second dielectric is moved towards a head end (the feed point).

With reference to the first aspect, in some implementations of the first aspect, the antenna structure includes a first radiator and a second radiator. The first radiator and the second radiator are disposed opposite to each other to form a third slot. The third slot is filled with the second dielectric, so that the bezel is still configured as a complete mechanical part after the third slot is provided. The second dielectric in the third slot is equivalent to a distributed capacitor between the first radiator and the second radiator, and a capacitance value of the distributed capacitor is related to a dielectric constant of the second dielectric. The dielectric constant of the second dielectric is greater than a dielectric constant of the first dielectric.

According to the technical solution in this embodiment of this application, the first radiator is configured as an exciting element, and the second radiator is configured as a parasitic element. The second dielectric different from the first dielectric is injected into a slot formed between the first radiator and the second radiator through second injection molding, which causes a significant change to antenna efficiency of a same antenna design.

With reference to the first aspect, in some implementations of the first aspect, the dielectric layer is configured to fasten the antenna radiator to the electronic device.

With reference to the first aspect, in some implementations of the first aspect, dissipation factors of the first dielectric and the second dielectric are the same.

With reference to the first aspect, in some implementations of the first aspect, a dissipation factor of the second dielectric is less than a dissipation factor of the first dielectric.

According to the technical solution in this embodiment of this application, the dissipation factor of the second dielectric may be adjusted according to actual production or design. This is not limited in this application.

With reference to the first aspect, in some implementations of the first aspect, a dielectric constant of the first dielectric is the same as a dielectric constant of the second dielectric, and a dissipation factor of the second dielectric is less than a dissipation factor of the first dielectric.

According to the technical solution in this embodiment of this application, a change is caconfigured to the antenna structure through second injection molding of a dielectric different from the first dielectric. It may be considered that a dissipation factor of the dielectric is reduced. Therefore, a loss of a plastic particle of the dielectric is reduced, and efficiency is relatively improved.

With reference to the first aspect, in some implementations of the first aspect, at least a part pf the surface of the antenna radiator are filled with the second dielectric. The first dielectric is a dielectric medium, and the second dielectric is a magnetic dielectric. Alternatively, the first dielectric is a magnetic dielectric, and the second dielectric is a dielectric medium.

According to the technical solution in this embodiment of this application, when the antenna structure is filled with particles of a high-loss magnetic material, radiation efficiency of the antenna is still high in a same antenna environment. For a dielectric layer in a region corresponding to the radiator of the antenna structure, if a dielectric with a high dissipation factor needs to be selected, a magnetic dielectric may be selected as a dielectric in a second injection molding process, so that better radiation efficiency can be obtained.

With reference to the first aspect, in some implementations of the first aspect, the second dielectric is disposed on at least a part of an inner surface of the antenna radiator.

According to the technical solution in this embodiment of this application, the at least a part of the inner surface of the antenna radiator may include a surface that is of the antenna radiator and that is close to a PCB or a battery inside the electronic device, and an end face of an end of the antenna radiator.

With reference to the first aspect, in some implementations of the first aspect, the second dielectric is disposed on at least a part of an outer surface of the antenna radiator, and a dielectric constant of the second dielectric is greater than a dielectric constant of the first dielectric.

According to the technical solution in this embodiment of this application, the second dielectric may be configured as an extension of the antenna radiator, to improve efficiency of the antenna structure.

With reference to the first aspect, in some implementations of the first aspect, an end of a first dielectric layer formed by the first dielectric is connected to an end of a second dielectric layer formed by the second dielectric.

According to the technical solution in this embodiment of this application, the first dielectric layer and the second dielectric layer may be adjacent.

DESCRIPTION OF EMBODIMENTS

The following describes technical solutions of this application with reference to accompanying drawings.

It should be understood that, in this application, "electrical connection" may be understood as a form in which components are physically in contact and are electrically conducted, or may be understood as a form in which different components in a line structure are connected through physical lines that can transmit an electrical signal, such as a printed circuit board (printed circuit board, PCB) copper foil or a conducting wire. "Communication connection" may refer to electrical signal transmission, including a wireless communication connection and a wired communication connection. The wireless communication connection requires no physical dielectric, and does not belong to a connection relationship that limits a product structure. Both "connection" and "being connected to" may refer to a mechanical connection relationship or a physical connection relationship. For example, a connection between A and B or that A is connected to B may mean that there is a fastening component (such as a screw, a bolt, or a rivet) between A and B, or A and B are in contact with each other and A and B are difficult to be separated.

The technical solutions provided in this application are applicable to an electronic device that uses one or more of the following communication technologies: a Bluetooth (Bluetooth, BT) communication technology, a global positioning system (global positioning system, GPS) communication technology, a wireless fidelity (wireless fidelity, Wi-Fi) communication technology, a global system for mobile communications (global system for mobile communications, GSM) communication technology, a wideband code division multiple access (wideband code division multiple access, WCDMA) communication technology, a long term evolution (long term evolution, LTE) communication technology, a 5G communication technology, and other future communication technologies. An electronic device in embodiments of this application may be a mobile phone, a tablet computer, a notebook computer, a smart band, a smartwatch, a smart helmet, smart glasses, or the like. Alternatively, the electronic device may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, an electronic device in a 5G network, an electronic device in a future evolved public land mobile network (public land mobile network, PLMN), or the like. This is not limited in this embodiment of this application.

Figure 1:
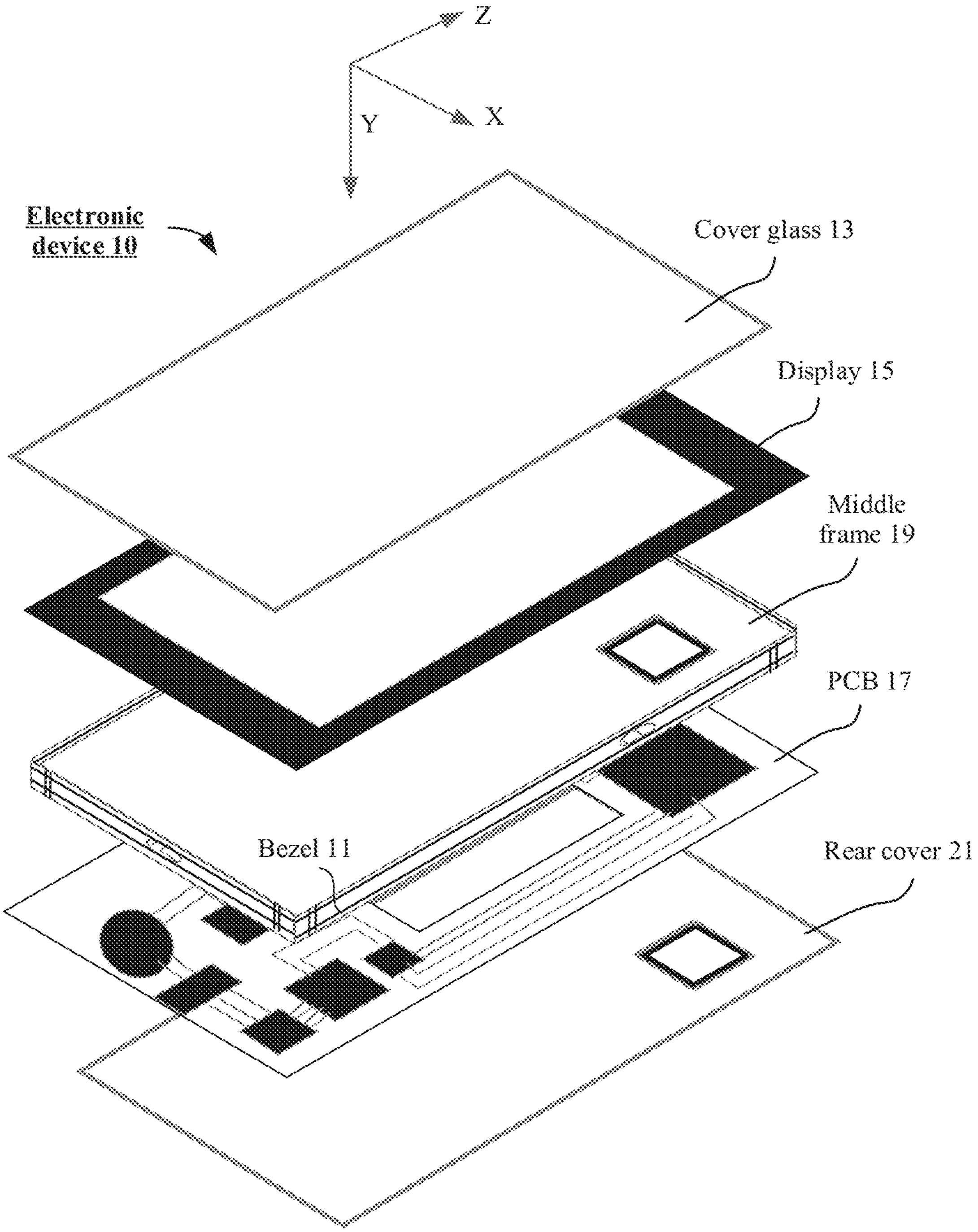
FIG. 1 is a schematic diagram of an electronic device according to an embodiment of this application.

FIG. 1 shows an example of an internal environment of an electronic device according to this application. An example in which the electronic device is a mobile phone is used for description.

As shown in FIG. 1, an electronic device 10 may include a glass cover (cover glass) 13, a display (display) 15, a printed circuit board (printed circuit board, PCB) 17, a middle frame (housing) 19, and a rear cover (rear cover) 21.

The glass cover 13 may be disposed close to the display 15, and may be mainly configured to protect the display 15 against dust.

In an embodiment, the display 15 may be a liquid crystal display (liquid crystal display, LCD), a light emitting diode (light emitting diode, LED), an organic light-emitting semiconductor (organic light-emitting diode, OLED), or the like. This is not limited in this application.

The printed circuit board PCB 17 may be a flame-retardant (FR-4) dielectric board, or may be a Rogers (Rogers) dielectric board, or may be a hybrid dielectric board of Rogers and FR-4, or the like. Herein, FR-4 is a grade designation for a flame-retardant material, and the Rogers dielectric board is a high frequency board. A metal layer may be disposed on a side that is of the printed circuit board PCB 17 and that is close to the middle frame 19, and the metal layer may be formed by etching metal on a surface of the PCB 17. The metal layer may be configured to ground an electronic element carried on the printed circuit board PCB 17, to prevent an electric shock of a user or device damage. The metal layer may be referred to as a PCB ground. In addition to the PCB ground, the electronic device 10 may have another ground used for grounding, for example, a metal middle frame.

The electronic device 10 may further include a battery, which is not shown herein. The battery may be disposed in the middle frame 19. The battery may divide the PCB 17 into a mainboard and a daughter board. The mainboard may be disposed between the middle frame 19 and an upper edge of the battery, and the daughter board may be disposed between the middle frame 19 and a lower edge of the battery.

The middle frame 19 is mainly configured to support the entire device. The middle frame 19 may include a bezel 11, and the bezel 11 may be made of a conductive material such as metal. The bezel 11 may extend around peripheries of the electronic device 10 and the display 15. The bezel 11 may specifically surround four sides of the display 15 to help fasten the display 15. In an implementation, the bezel 11 made of a metal material may be directly configured as a metal bezel of the electronic device 10 to form an appearance of the metal bezel, which is applicable to a metal ID. In another implementation, an outer surface of the bezel 11 may be a non-metal material, for example, a plastic bezel, to form an appearance of a non-metal bezel, which is applicable to a non-metal ID.

The rear cover 21 may be a rear cover made of a metal material, or may be a rear cover made of a non-conductive material, such as a glass rear cover or a plastic rear cover.

FIG. 1 shows only an example of some components included in the electronic device 10. Actual shapes, actual sizes, and actual structures of these components are not limited in FIG. 1.

Currently, an electronic device commonly uses a NMT-based metal mechanical part as an exterior part. The NMT is a process of combination of metal and plastic by nanotechnology. The NMT is a process in which nanocrystallization processing is performed on a metal surface, and then plastic is molded on the metal surface through direct injection, so that the metal and the plastic can be integrally molded. This technology is configured to balance an appearance and texture of the metal, and enable a product to be lighter and thinner.

Figure 2:
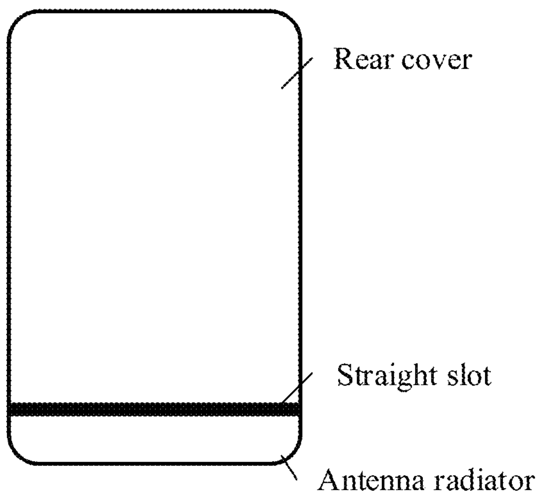
FIG. 2 is an example of a schematic diagram of a structure of an NMT-based metal mechanical part.

In an electronic device whose metal exterior part is formed through NMT injection molding, antennas of the electronic device all use a metal exterior part as a radiator of the antenna. For example, the metal mechanical part may be a rear cover of the electronic device shown in FIG. 2. A complete metal rear cover may be divided into two parts by filling plastic particles into a formed straight slot by using an NMT process. The antenna radiator part is located at the bottom of the plastic slot, such as the top or bottom of the electronic device.

It should be understood that, for the antenna in the electronic device, a slot formed between the antenna and a bezel or between the antenna and a middle frame needs to be filled with plastic particles, so that the antenna radiator is fastened in the electronic device, and the antenna radiator and the bezel or the middle frame form a complete mechanical part. By using the NMT process, plastic particles can be usually injected to a metal mechanical part at a time in a pre-designed region. A function of a dielectric layer formed by using the NMT process is to fasten the antenna radiator to the electronic device. For example, when a metal bezel is provided with a slot to be reconfigured as the antenna radiator, the dielectric layer may use the metal bezel provided with the slot as a complete mechanical part. When the antenna radiator is disposed in the bezel and a slot is formed between the antenna radiator and the middle frame, the dielectric layer may combine an antenna stub and the middle frame as a complete mechanical part. Because the antenna radiator is also configured as a part of an exterior part of a metal structure, a plastic particle for nano-molding needs to meet a requirement of a nano-molding process, and an electrical characteristic of the particle also needs to meet a requirement related to antenna design. The electronic device needs to support a 2G/3G/4G/5G communication specification, the antenna design needs to correspondingly meet frequency band requirements of different communication system standards, and communication needs to cover a frequency band of 700 MHz to 6000 MHz. Dielectric constant (dielectric constant, DK) and dissipation factor (dissipation factor, DF) values of plastic particles in these frequency bands can reflect dielectric parameters of the particles. Usually, DK=3.5 and DF=0.015 are dielectric parameters of nano-molding particles in a typical radio frequency band. Usually, when the DK value and the DF value increase (for an ideal material, DK=1, and DF=0), antenna radiation efficiency decreases to different degrees. Compared with the DK, the DF has a greater impact on antenna radiation efficiency. When the DK increases, an electrical size of the antenna decreases accordingly, and a bandwidth of the antenna is narrowed accordingly.

An embodiment of this application provides an antenna structure. A secondary injection molding process is performed by using an NMT process to change dielectric parameters of a dielectric layer corresponding to a radiator of the antenna structure at different positions, so that an antenna radiation characteristic can be changed, and antenna radiation efficiency can be improved. For example, a dielectric with a high DK value may be filled in a slot formed between an exciting element and a parasitic element of the antenna radiator, to improve coupling between resonance generated by the exciting element and resonance generated by the parasitic element, and improve antenna radiation efficiency. Alternatively, a dielectric with a high DK value may be disposed on a side that is of the antenna radiator and that is away from a feed point, so that ground excitation becomes relatively more sufficient, to improve antenna radiation efficiency. Alternatively, a dielectric with a low DF value or a low DK value may be used in a dielectric layer region corresponding to the antenna radiator, to reduce a loss of a plastic particle of a dielectric, and improve antenna radiation efficiency.

It should be understood that, in this application, the dielectric may be a solid dielectric, or may be a dielectric or a magnetic dielectric. This is not limited in this application, and may be selected according to actual production or design.

Figure 3A:
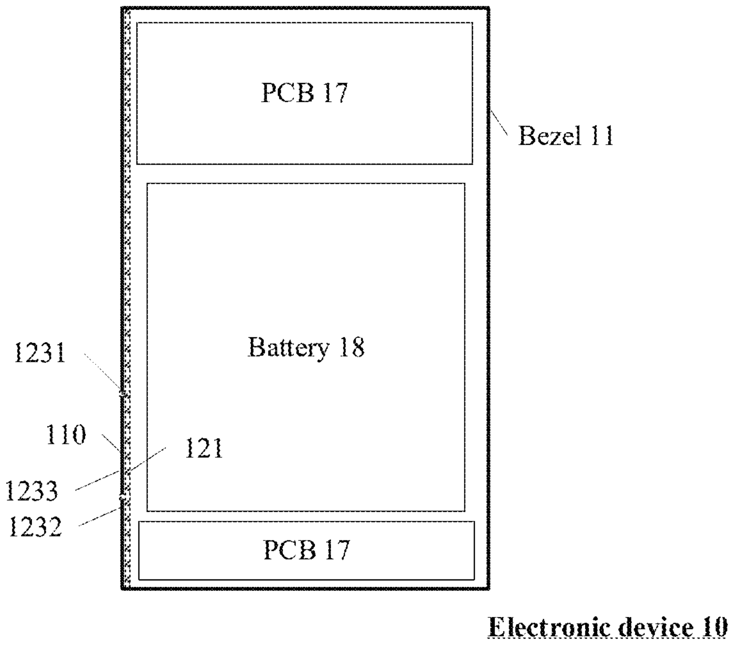
FIG. 3A and FIG. 3B are schematic diagrams of a structure of an electronic device according to an embodiment of this application.
Figure 3B:
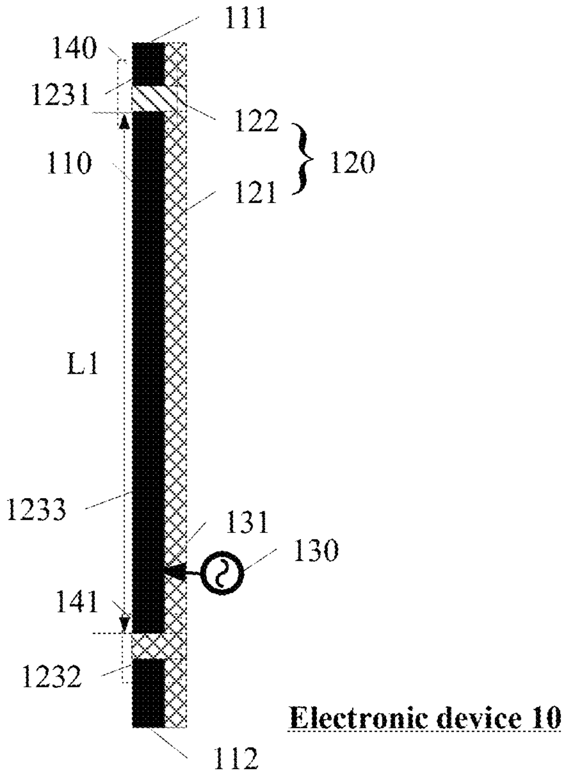

FIG. 3A and FIG. 3B are schematic diagrams of a structure of an electronic device according to an embodiment of this application.

It should be understood that, in this embodiment of this application, the antenna structure may be an inverted L antenna (inverted L antenna, ILA), an inverted F antenna (inverted F antenna, IFA), or a planar inverted F antenna (planner Inverted F antenna, PIFA), or may be an antenna structure in another form. This is not limited in this application.

As shown in FIG. 3A, the electronic device 10 may include the bezel 11 and a dielectric layer 120. The bezel 11 may include a first position 1231 and a second position 1232, and a third position 1233. The third position 1233 on a bezel between the first position 1231 and the second position 1232 is configured as an antenna radiator 110. In this embodiment, the bezel between the first position 1231 and the second position 1232 is a bezel between the position 1231 and the position 1232 on a left side of the bezel, as shown in FIG. 3A.

As shown in FIG. 3B, the dielectric layer 120 is disposed on a surface of the bezel 11. The dielectric layer 120 may include a first dielectric layer 121 and a second dielectric layer 122 that are connected to each other. The first dielectric layer 121 includes a first dielectric, the second dielectric layer 122 includes a second dielectric, and the first dielectric is different from the second dielectric. The first dielectric layer 121 including the first dielectric is disposed on at least a part of an inner surface of the bezel 11 besides the bezel at the third position 1233 between the first position 1231 and the second position 1232. A bezel other than the bezel between the first position 1231 and the second position 1232 may be a bezel above the position 1231 or below the position 1232 on the left side of the bezel, or a bezel on another side, as shown in FIG. 3A. The second dielectric layer 122 including the second dielectric is disposed on at least a part of a surface of the antenna radiator 110.

The bezel 11 at the third position 1233 between the first position 1231 and the second position 1232 may be considered as a bezel corresponding to a path that is between the first position 1231 and the second position 1232 and that has a shortest distance along the bezel. The bezel other than the bezel between the first position 1231 and the second position 1232 may be considered as a bezel corresponding to a path that is between the first position 1231 and the second position 1232 and that has a longest distance along the bezel.

It should be understood that the first dielectric layer 121 and the second dielectric layer 122 may be disposed in parallel. For example, both the first dielectric layer 121 and the second dielectric layer 122 are in contact with the bezel 11, and an end of the first dielectric layer 121 is connected to an end of the second dielectric layer 122. In addition, the inner surface of the bezel 11 may be considered as a surface that is of the bezel and that is close to a PCB or a battery in the electronic device, or may be considered as an end surface of the bezel 11 on which a slot is formed.

In an embodiment, the dielectric layer 120 includes the first dielectric layer 121 and the second dielectric layer 122 between the first position 1231 and the second position 1232. For example, the first dielectric layer 121 and the second dielectric layer 122 are disposed on the dielectric layer corresponding to the antenna radiator 110, and the first dielectric layer 121 and the second dielectric layer 122 may be disposed adjacent to each other.

It should be understood that the dielectric layer 120 may also cover all or a part of the bezel 11 at other positions. For brevity of this specification, in the following embodiments, only a dielectric layer in a region corresponding to the antenna radiator 110 is configured as an example for description. For example, a dielectric layer between the first position 1231 and the second position 1232 is used for description. A dielectric layer outside the region may be the first dielectric layer 121 including the first dielectric or another dielectric. This is not limited in this application.

In an embodiment, the antenna radiator 110 is configured as a segment of the bezel 11, and may form a housing of the electronic device 10 together with the bezel 11 and the rear cover of the electronic device 10. It should be understood that another antenna structure may also be disposed on the bezel 11, to meet a communication requirement of a user.

In an embodiment, that the first dielectric is different from the second dielectric may be understood as that both the first dielectric and the second dielectric are dielectric medium, and the first dielectric and the second dielectric have different DKs or DFs. That the first dielectric and the second dielectric have different DKs or DFs may be considered as that the DKs or the DFs are different, or both the DKs and the DFs are different. Selection may be performed according to actual production or design. This is not limited in this application.

In an embodiment, a DK value of the second dielectric layer 122 may be greater than that of the first dielectric layer 121. In this case, a DF value of the second dielectric layer 122 may be the same as that of the first dielectric layer 121.

In an embodiment, that the first dielectric layer 121 is different from the second dielectric layer 122 may be understood as that one of the first dielectric layer 121 and the second dielectric layer 122 is a magnetic dielectric, and the other is a dielectric medium.

In an embodiment, the electronic device 10 may further include a feed unit 130. A feed point 131 is disposed on the first radiator 110, and the feed unit 130 is electrically connected to or coupled to the first radiator 110 at the feed point 131, to provide an electrical signal for the antenna radiator 110. It should be understood that, in this embodiment, the feed point 131 is merely configured as an example, and does not constitute any limitation. The feed point 131 may be adjusted according to actual production or design. This is not limited in this application.

In an embodiment, the antenna structure formed by the antenna radiator 110 may work in a quarter wavelength mode. A length L1 of the first radiator may be designed and adjusted based on an actual operating frequency band.

In an embodiment, the second dielectric is disposed on a side that is of the dielectric layer and that is away from the feed point.

In an embodiment, as shown in the figure, the first radiator 110 is disposed opposite to an end of an adjacent bezel 111 to form a first slot 140. The end of the adjacent bezel 11 may be the first position 1231 or the second position 1232 of the bezel 11. The first slot 140 may be filled with the second dielectric, to form at least a part of the second dielectric layer 122.

It should be understood that in this embodiment of this application, an example in which the slot 140 filled with the second dielectric is disposed at the first position 1231 of the adjacent bezel 111 is used for description. A slot 141 disposed at the second position 1232 of an adjacent bezel 112 may be filled with the first dielectric, and the first dielectric in the slot 141 is configured to make the bezel 11 provided with the slot still a complete mechanical part.

In an embodiment, the electronic device 10 may further include the PCB 17 and a battery 18. The dielectric layer 120 may be located between the first radiator 110 and the PCB 17 or the battery 18.

It should be understood that, in the technical solution provided in this embodiment of this application, a structure of the dielectric layer may be changed by using a secondary injection molding process. The dielectric layer may be disposed between mechanical parts (a middle frame, a battery, or a PCB) adjacent to or connected to the antenna radiator, so that the dielectric layer includes two different dielectric materials, and a corresponding part of the antenna radiator 110 is filled with a dielectric layer with a higher DK value, to meet a requirement of the antenna structure. Alternatively, in some cases, a dielectric with a lower DK value may be filled in a corresponding part of the antenna radiator 110. This can also achieve a same technical effect.

Figure 4:
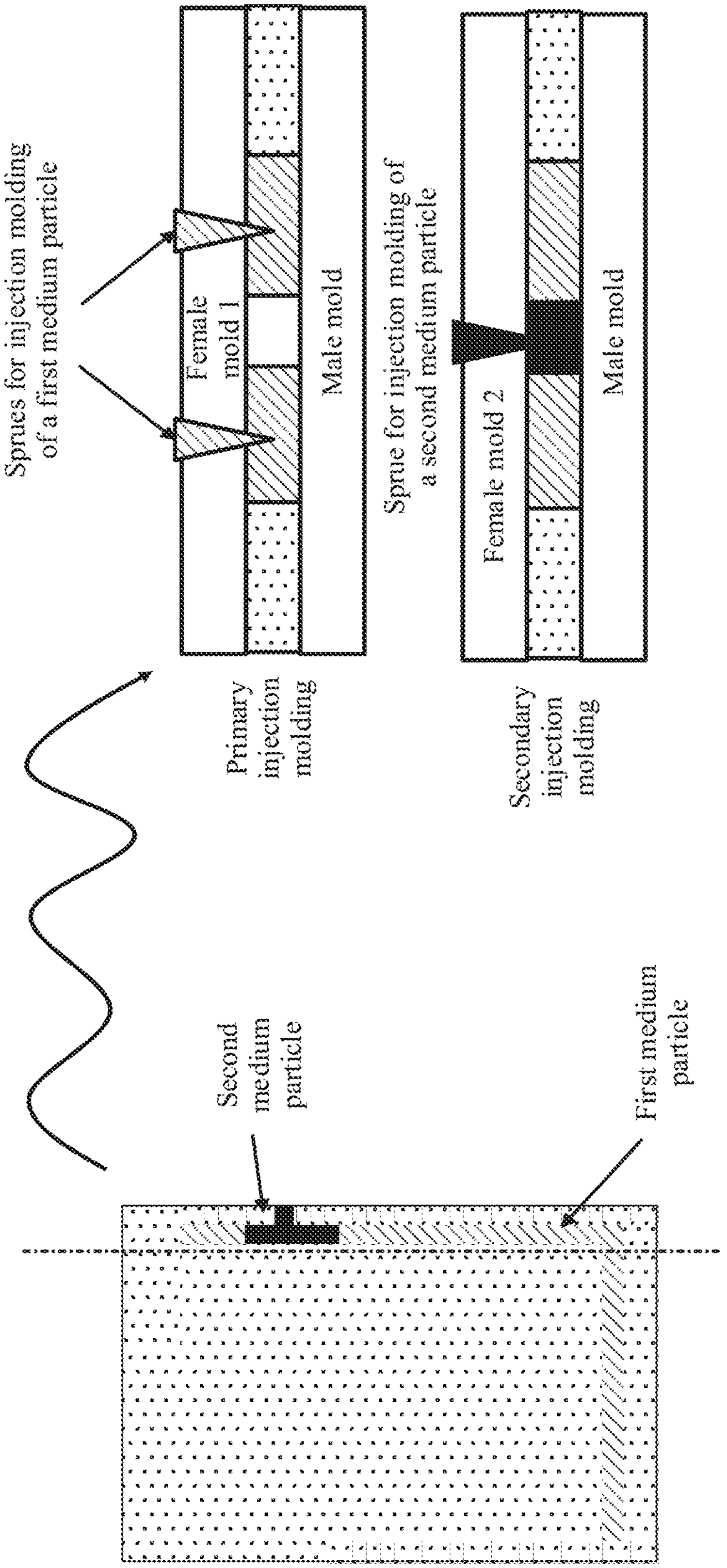
FIG. 4 is a schematic diagram of a secondary injection molding process according to an embodiment of this application.

FIG. 4 is a schematic diagram of a secondary injection molding process according to an embodiment of this application.

As shown in FIG. 4, particles in a first dielectric and particles in a second dielectric may be sequentially injected, by using different female molds, into positions corresponding to the dielectric layer based on process steps, to change dielectric parameters of the dielectric layer corresponding to the radiator at different positions, so that an antenna radiation characteristic can be changed, and antenna radiation efficiency can be improved. For example, secondary injection molding may be implemented by using the following steps: primary mold clamping, primary injection, mold opening, secondary mold clamping, secondary injection, and ejection. Alternatively, secondary injection molding may be implemented by using another step. This is merely configured as an example herein in this application.

It should be understood that, this embodiment of this application provides only a solution of implementing an antenna structure by using a secondary injection molding process, or may implement a same antenna structure by using another technology. This is not limited in this application.

Figure 5A:
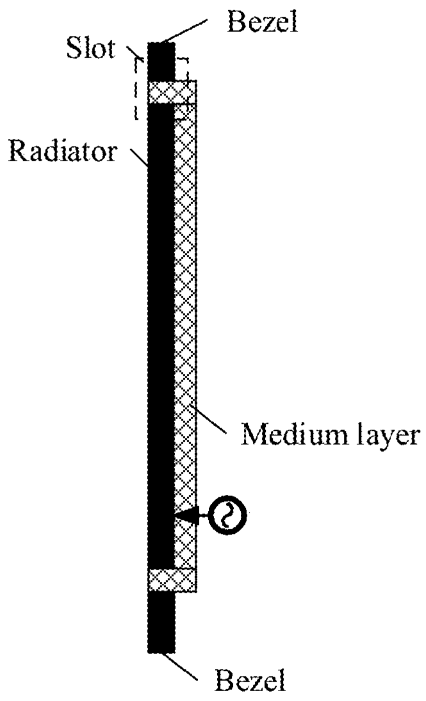
FIG. 5A and FIG. 5B are schematic diagrams of a conventional antenna structure.
Figure 5B:
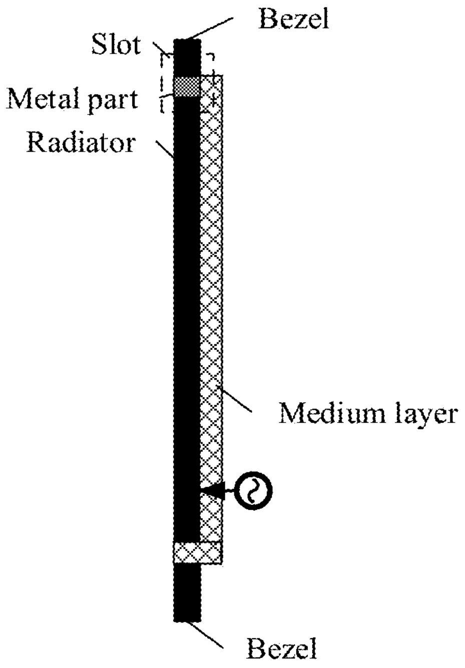

FIG. 5A and FIG. 5B are a schematic diagram of an antenna structure used for comparison with an embodiment of this application.

According to the antenna structure shown in FIG. 5A, a slot disposed on a bezel, for example, a slot formed between a radiator and an adjacent bezel, is filled with a first dielectric, and a dielectric layer also includes only a first dielectric layer. For example, the antenna structure is an ILA in an original state.

According to the antenna structure shown in FIG. 5B, the slot disposed on the bezel, for example, the slot formed between the radiator and the adjacent bezel, is connected by using a metal part. For example, the radiator is connected to the adjacent bezel by using the metal part, and the dielectric layer also includes only the first dielectric layer. It should be understood that, after the radiator is connected to the adjacent bezel by using the metal part, the antenna structure is a composite right and left hand (composite right and left hand, CRLH) antenna.

Figure 6:
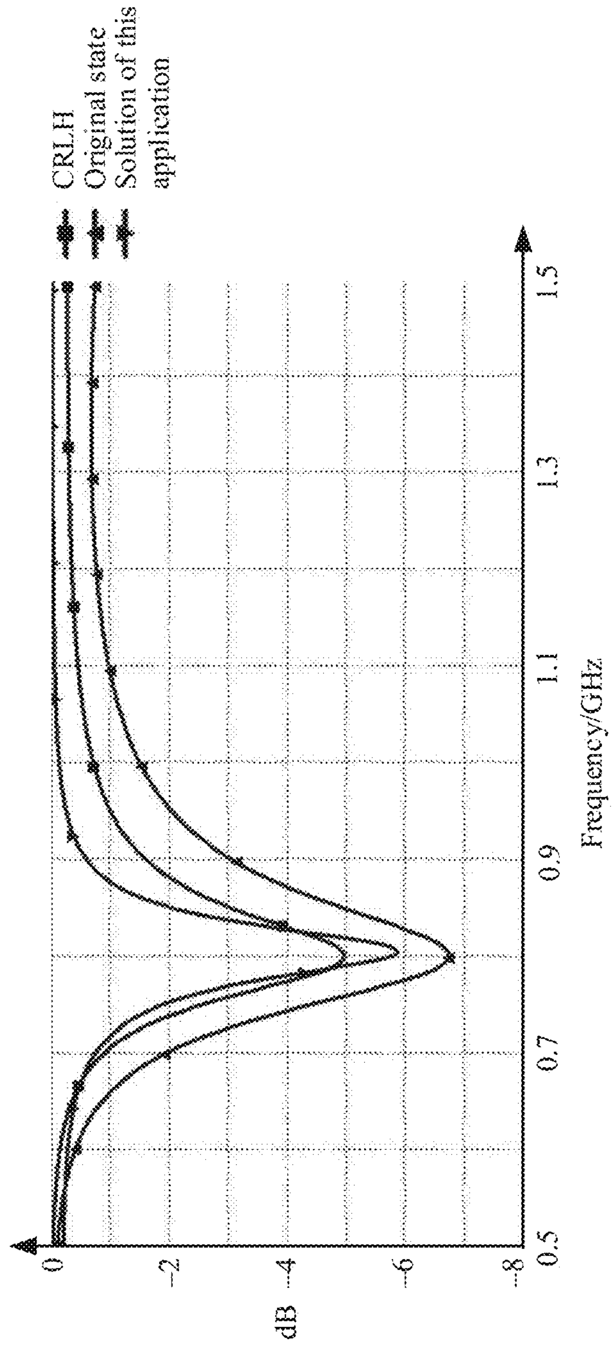
FIG. 6 is a schematic diagram of an S11 parameter simulation result of the antenna structure shown in FIG. 3A and FIG. 3B.
Figure 7:
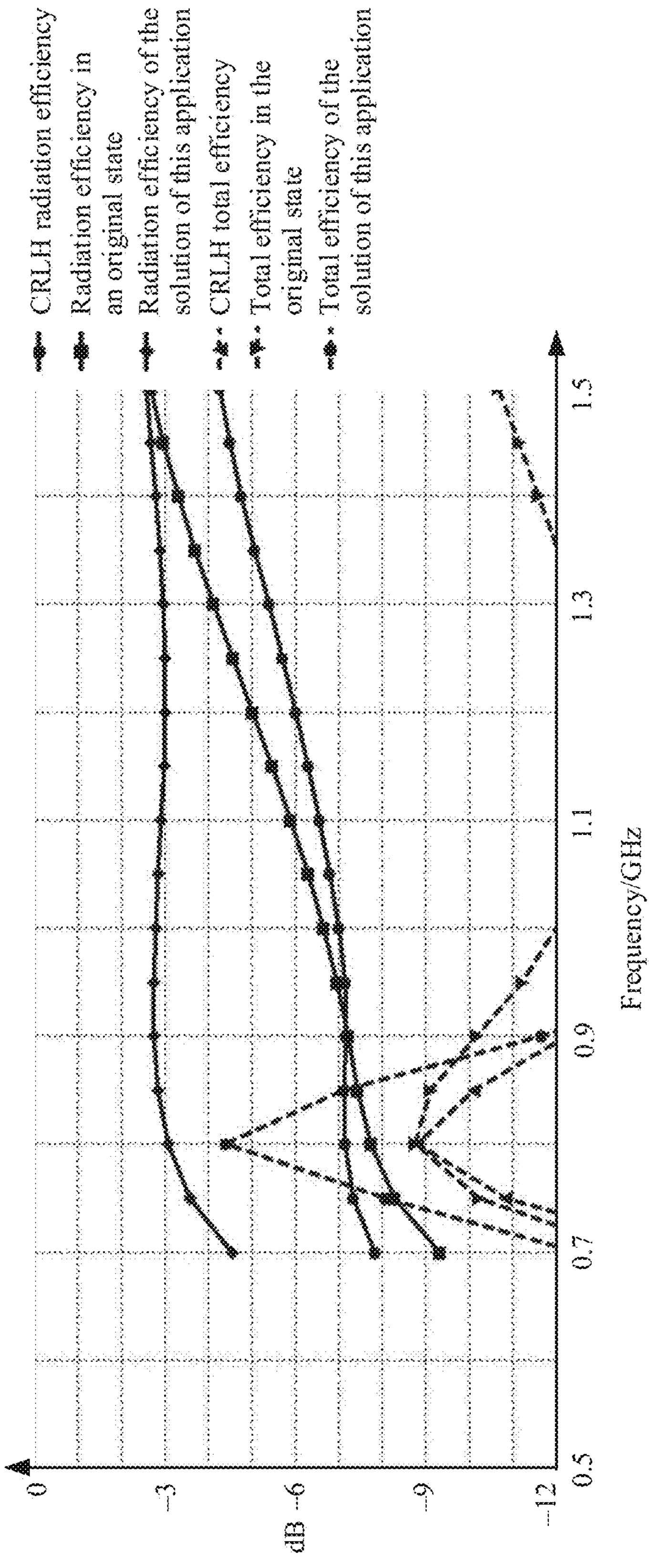
FIG. 7 is a schematic diagram of simulation results of radiation efficiency and total efficiency of the antenna structure shown in FIG. 3A and FIG. 3B.

FIG. 6 and FIG. 7 are schematic diagrams of simulation comparison results of the antenna structures formed by the antenna radiators shown in FIG. 3A, FIG. 3B, FIG. 5A, and FIG. according to an embodiment of this application. FIG. 6 is a schematic diagram of an S11 parameter simulation result according to an embodiment of this application. FIG. 7 is a schematic diagram of simulation results of radiation efficiency (radiation efficiency) and total efficiency (total efficiency) according to an embodiment of this application; It should be understood that in the antenna structure shown in FIG. 3A, FIG. 3B, FIG. 5A, and FIG. 5B, antenna types are different. Therefore, different matching is performed on all different antenna types. Results shown in FIG. 6 and FIG. 7 are diagrams of simulation results obtained after matching is added.

In this embodiment, the antenna structure may work in a low frequency band. In this case, the corresponding length L1 of the first radiator may be 38 mm. In addition, a DK value of the first dielectric may be 3.5, and a DK value of the second dielectric may be 100. DF values of the first dielectric and the second dielectric may be the same, and both are 0.015. It should be understood that the foregoing dielectric parameters are merely configured as examples. This is not limited in this embodiment of this application, and may be adjusted according to actual production or design.

As shown in FIG. 6, when the feed unit performs feeding, both the antenna structures shown in FIG. 3A, FIG. 3B, FIG. 5A, and FIG. 5B can excite resonance near 800 MHz, and resonance points of the resonance are both 800 MHz, which can meet a communication requirement.

As shown in FIG. 7, in a same environment of the antenna structure provided in this embodiment of this application, radiation efficiency and total efficiency of the antenna structure are improved by more than 4 dB compared with those of the antenna structure shown in FIG. 5A and FIG. 5B, and a benefit from efficiency improvement is very high.

Figure 8A:
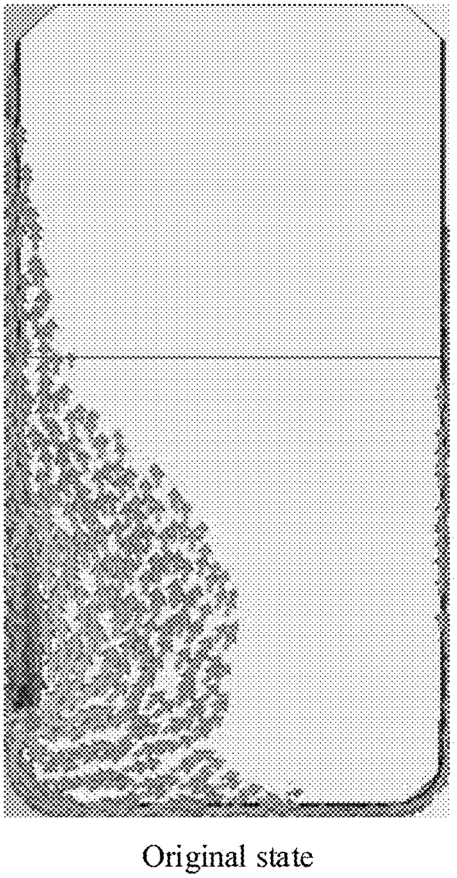
FIG. 8A to FIG. 8C are schematic diagrams of current distribution of the antenna structure shown in FIG. 3A and FIG. 3B.
Figure 8B:
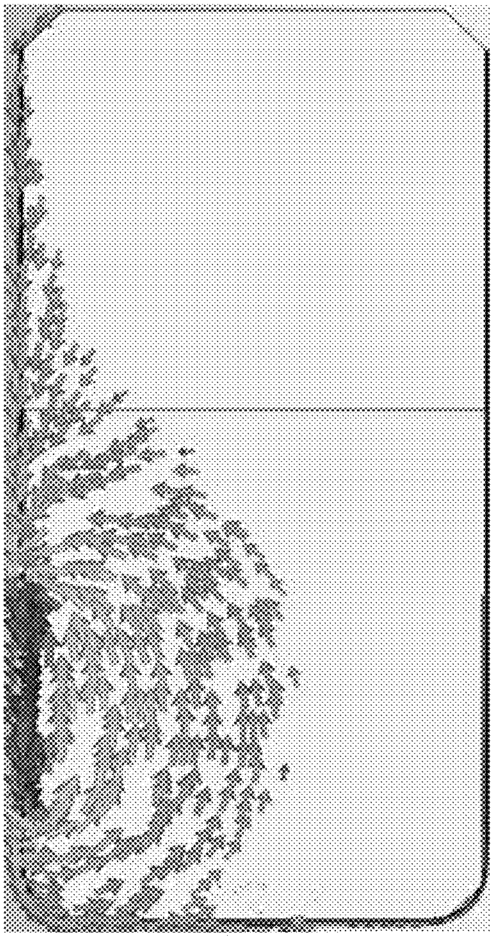
Figure 8C:
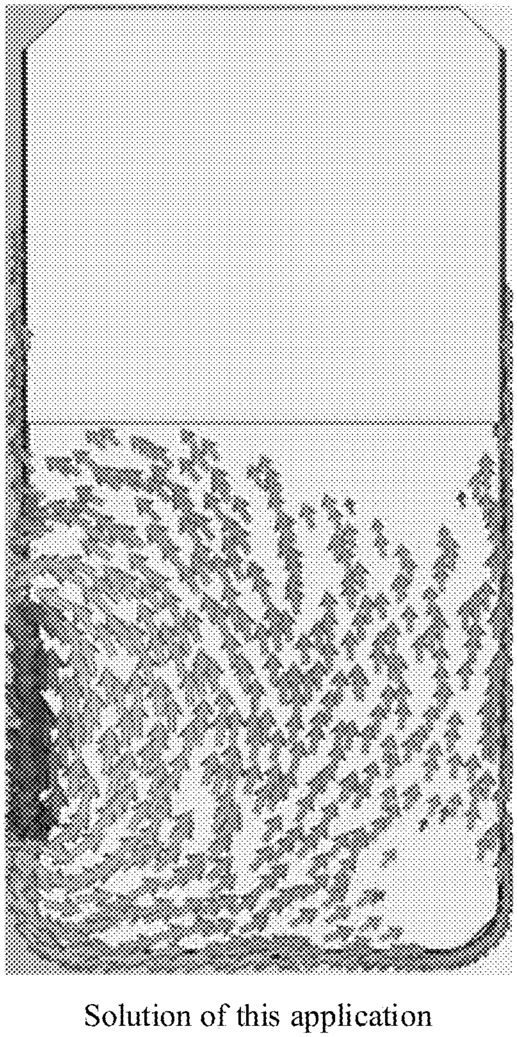

FIG. 8A to FIG. 8C are schematic diagrams of current distribution of the antenna structures shown in FIG. 3A, FIG. 3B, FIG. 5A, and FIG. 5B according to an embodiment of this application.

FIG. 8A is a schematic diagram of current distribution corresponding to the ILA in the original state shown in FIG. 5A. FIG. 8B is a schematic diagram of current distribution corresponding to the CRLH antenna, shown in FIG. 5B, used when the radiator is connected to the adjacent bezel by using the metal part. FIG. 8C is a schematic diagram of current distribution of the antenna structure according to this embodiment of this application.

As shown in FIG. 8A to FIG. 8C, it can be learned that, when the antenna structure provided in this embodiment of this application works, compared with a conventional antenna structure, a larger current on the ground is excited. It may be also indicated that in given antenna space, the antenna structure provided in this embodiment of this application can achieve better antenna efficiency.

It should be understood that in the antenna structure provided in this embodiment of this application, the second dielectric is configured to fill the slot on the bezel, so that the bezel can still be configured as a complete mechanical part after the first slot is provided. The second dielectric with a high DK value is configured to fill the slot disposed on the bezel, and the second dielectric filled in the slot may be equivalent to a distributed capacitor. A calculation formula of a capacitance value is as follows:

$$C = \frac{\varepsilon S}{4\pi k d}$$

ε is a dielectric constant, and is a DK value in this embodiment of this application; δ is an absolute dielectric constant in a vacuum; k is an electrostatic force constant; S is an area of overlap between two electrode plates, and is a relative area of the bezels (for example, an antenna radiator and an adjacent bezel) on two sides of the slot in this embodiment of this application; and d is a vertical distance between the two electrode plates, and is a width of the slot in this embodiment of this application.

As shown in the foregoing formula, when a frequency remains unchanged, a higher DK value indicates a larger capacitance value of the formed distributed capacitor. After an antenna structure is filled with the dielectric with a high DK, improvement in radiation efficiency corresponding to the antenna structure may be understood as that ground excitation in the electronic device becomes relatively more sufficient, so that radiation efficiency of the antenna structure is improved. In addition, because the capacitance value of the equivalent distributed capacitor also depends on a width of the slot, an overlapping area of metal on two sides of the slot, and the like, DK values of dielectrics in different antenna structures may vary greatly, and may be adjusted according to actual production or design. This is not limited in this application.

In an embodiment, the ground in the foregoing embodiment may be a PCB, a middle frame, or another metal layer of the electronic device. This is not limited in this application.

It should be understood that in this embodiment, if one or both of the DK and/or the DF of the second dielectric in the dielectric layer are reduced relative to the DK and/or the DF corresponding to the first dielectric, the DK and/or the DF of the second dielectric may approach 1 (a limit value) in an extreme case. In this case, radiation efficiency of the antenna structure is also improved.

In addition, in this embodiment of this application, for ease of comparison with a conventional antenna structure, the first dielectric and the second dielectric have a same DF value but different DK values. In actual production or design, the DF value or the DK value of the first dielectric and the second dielectric may be adjusted at the same time. This is not limited in this application.

Figure 9:
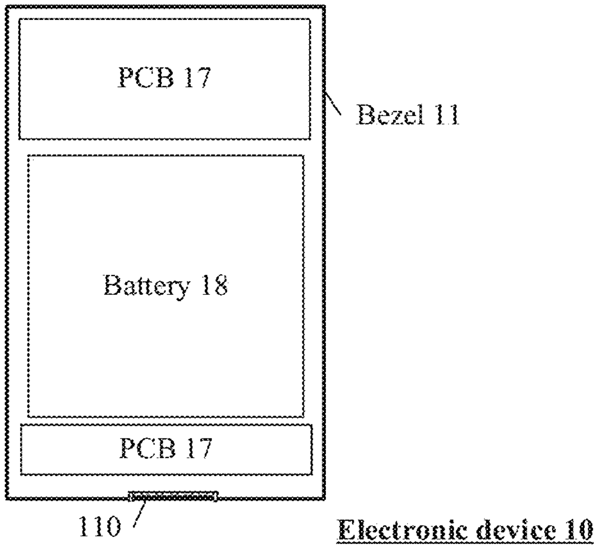
FIG. 9 is a schematic diagram of a structure of an electronic device according to an embodiment of this application.

FIG. 9 is a schematic diagram of a structure of an electronic device according to an embodiment of this application.

As shown in FIG. 9, the antenna radiator 110 may alternatively be disposed at the bottom of the electronic device.

In an embodiment, an operating frequency band of the antenna structure formed by the antenna radiator 110 may cover a global positioning system (global positioning system, GPS) frequency band of 1500 MHz to 1600 MHz.

Figure 10:
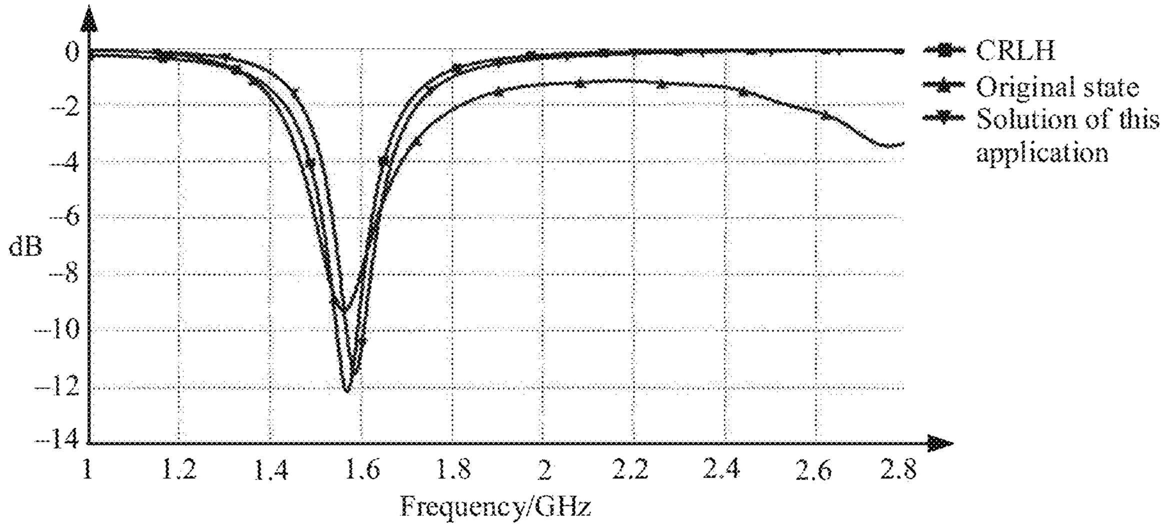
FIG. 10 is a schematic diagram of an S11 parameter simulation result according to an embodiment of this application.
Figure 11:
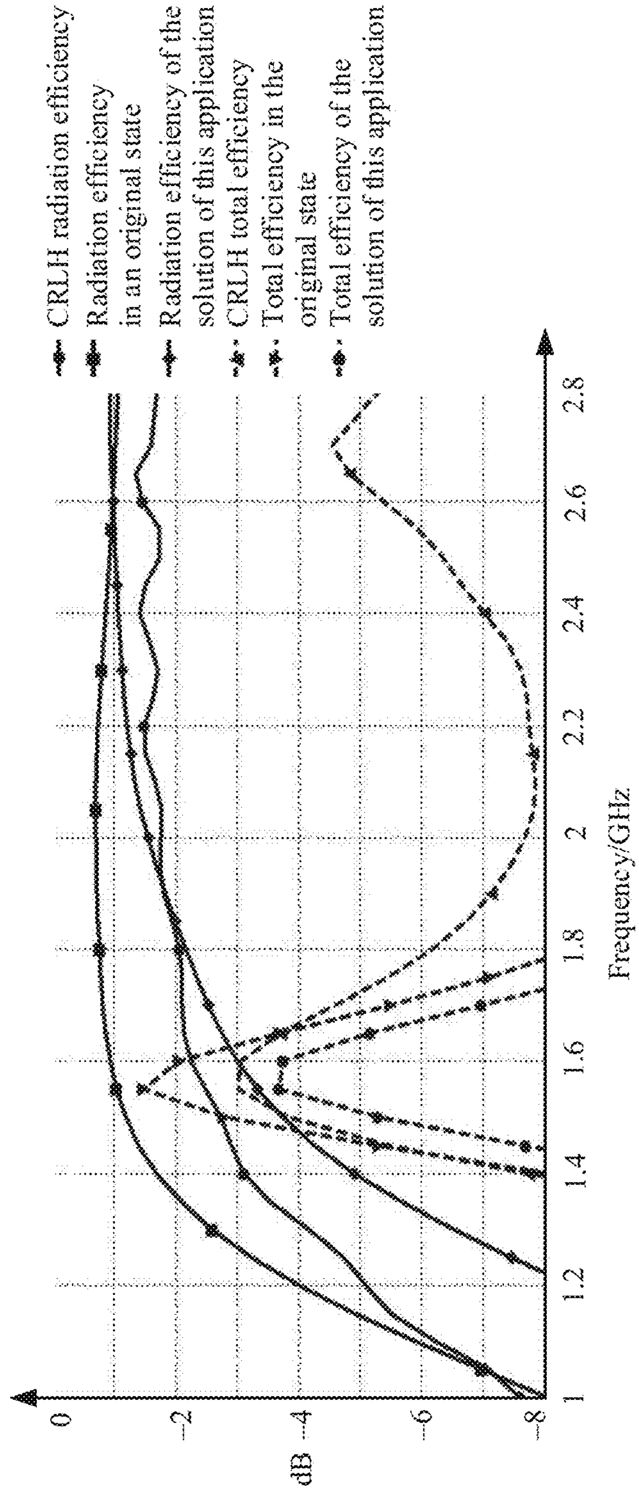
FIG. 11 is a schematic diagram of simulation results of radiation efficiency and total efficiency according to an embodiment of this application.

FIG. 10 and FIG. 11 are schematic diagrams of simulation results of the antenna structure shown in FIG. 9 according to an embodiment of this application. FIG. 10 is a schematic diagram of an S11 parameter simulation result according to an embodiment of this application. FIG. 11 is a schematic diagram of simulation results of radiation efficiency and total efficiency according to an embodiment of this application.

Compared with the antenna structure shown in FIG. 3A and FIG. 3B, in this embodiment, the antenna structure may also work in a high frequency band. In this case, the corresponding length L1 of the first radiator may be 23 mm. In addition, a DK value of the first dielectric may be 3.5, and a DK value of the second dielectric may be 30. DF values of the first dielectric and the second dielectric may be the same, and both are 0.015. It should be understood that the foregoing dielectric parameters are merely configured as examples. This is not limited in this embodiment of this application, and may be adjusted according to actual production or design.

As shown in FIG. 10, when the feed unit performs feeding, operating frequency bands of both the antenna structure shown in FIG. 9 and the antenna structure shown in FIG. 5A and FIG. 5B may cover the GPS frequency band, which can meet a communication requirement.

As shown in FIG. 11, in a same environment of the antenna structure provided in this embodiment of this application, radiation efficiency and radiation efficiency of the antenna structure are improved by more than 1 dB compared with those of the antenna structure shown in FIG. 5A and FIG. 5B, and a benefit from efficiency improvement is very high.

It should be understood that, in the antenna structure provided in this embodiment of this application, the second dielectric with a high DK value is configured to fill the slot formed between the first radiator and the adjacent bezel, and the second dielectric filled in the slot may be equivalent to a distributed capacitor connected in parallel to the antenna radiator. After an antenna structure is filled with the dielectric with a high DK, improvement in radiation efficiency corresponding to the antenna structure may be understood as that ground excitation in the electronic device becomes relatively more sufficient, so that radiation efficiency of the antenna structure is improved.

In addition, in this embodiment of this application, for ease of comparison with a conventional antenna structure, the first dielectric and the second dielectric have a same DF value but different DK values. In actual production or design, the DF value or the DK value of the first dielectric and the second dielectric may be adjusted at the same time. This is not limited in this application.

FIG. 12A to FIG. 12D are schematic diagrams of a structure of an electronic device according to an embodiment of this application.

Figure 12A:
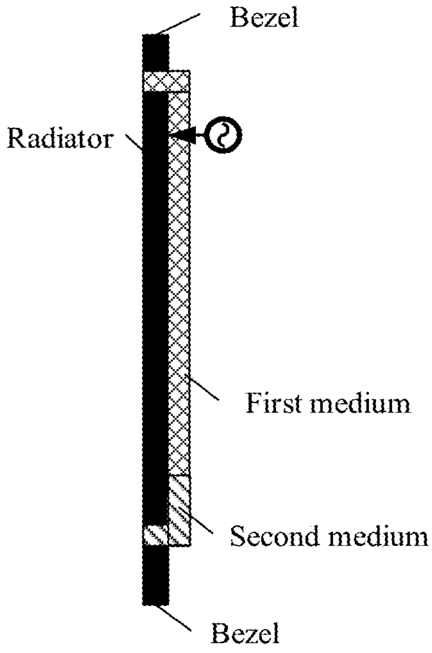
FIG. 12A to FIG. 12D are schematic diagrams of a structure of an electronic device according to an embodiment of this application.

According to the antenna structure provided in this embodiment of this application shown in FIG. 12A, the slot formed between the antenna radiator and the adjacent bezel is filled with the second dielectric, a DK value of the second dielectric may be greater than that of the first dielectric, and a DF value of the second dielectric may be the same as that of the first dielectric. Alternatively, a DF value of the second dielectric may be different from that of the first dielectric. For example, the DF value of the second dielectric may be less than that of the first dielectric, and may be adjusted according to actual production or design. This is not limited in this application.

Figure 12B:
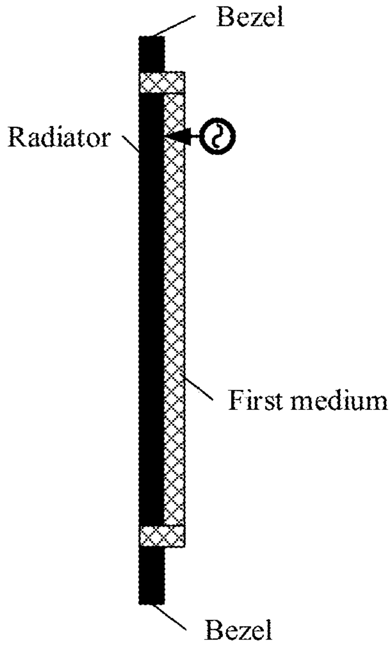

In a comparison antenna structure shown in FIG. 12B, the slot formed between the radiator and the adjacent bezel is filled with the first dielectric, and the dielectric layer also includes only the first dielectric layer. For example, the antenna structure is the ILA in the original state.

Figure 12C:
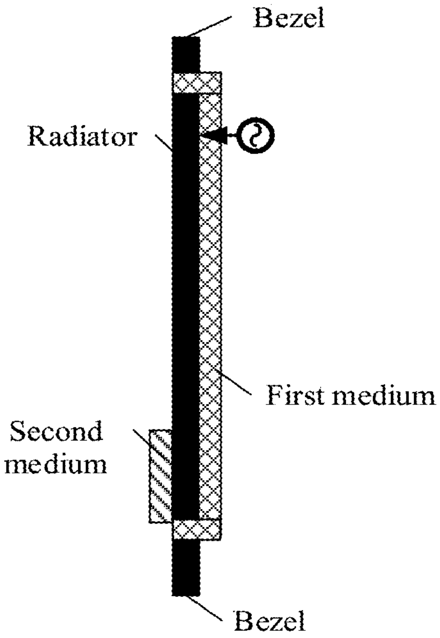

In a comparison antenna structure shown in FIG. 12C, on the basis of the antenna structure shown in FIG. 12B, a part of an outer surface of the radiator is covered with the second dielectric.

Figure 12D:
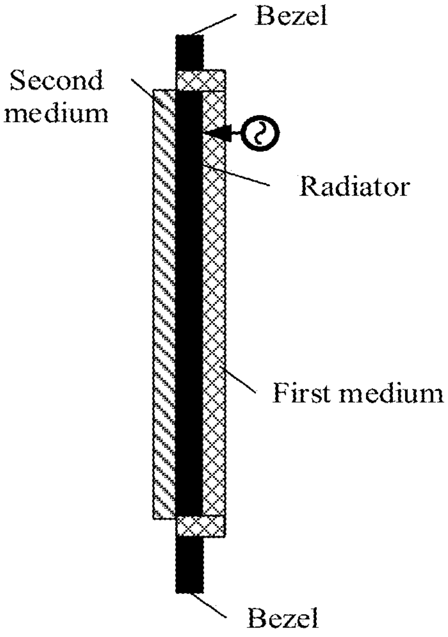

In a comparison antenna structure shown in FIG. 12D, on the basis of the antenna structure shown in FIG. 12B, all of the outer surface of the radiator is covered with the second dielectric.

Figure 13:
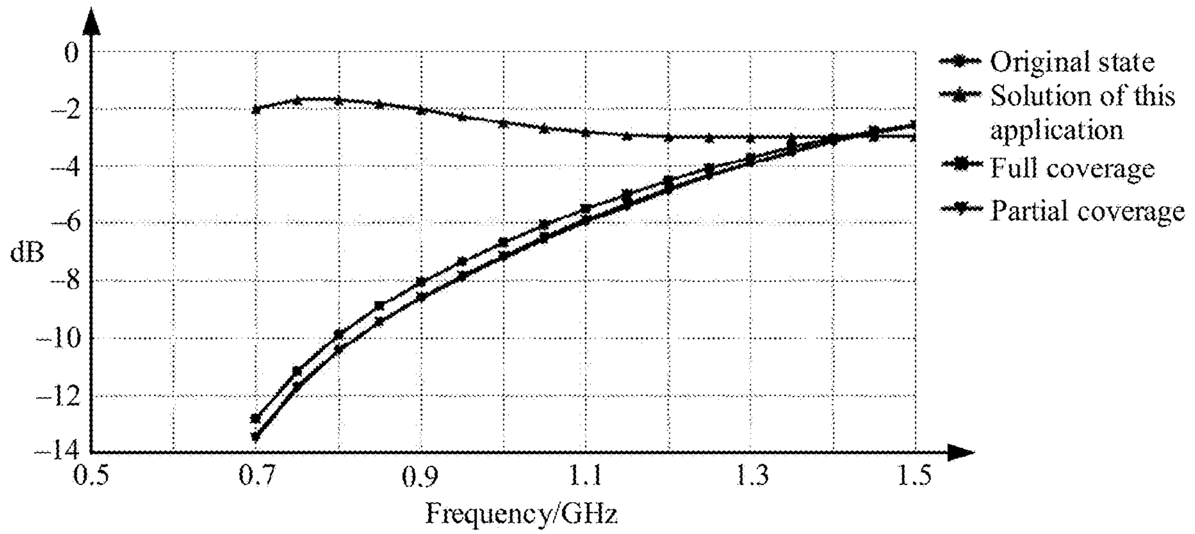
FIG. 13 is a schematic diagram of a simulation result of radiation efficiency of the antenna structure shown in FIG. 12A to FIG. 12D.

FIG. 13 is a schematic diagram of a simulation result of radiation efficiency of the antenna structure shown in FIG. 12A to FIG. 12D.

In this embodiment, the antenna structure may also work in a low frequency band, a DK value of the first dielectric may be 3.5, and a DK value of the second dielectric may be 100. DF values of the first dielectric and the second dielectric may be the same, and both are 0.015. It should be understood that the foregoing dielectric parameters are merely configured as examples. This is not limited in this embodiment of this application, and may be adjusted according to actual production or design.

In this application, a secondary injection molding process is performed by using an NMT process to change a material of a dielectric layer corresponding to the antenna radiator, which is closely related to a position of the second dielectric in the secondary injection molding. A design is optimized and a filling position is selected, so that antenna efficiency can be significantly improved in a low frequency band (700 MHz to 1000 MHz).

As shown in FIG. 13, compared with the antenna structures shown in FIG. 12B to FIG. 12D, after the antenna structure provided in this embodiment of this application undergoes secondary injection molding, radiation efficiency is improved by about 4 dB to 10 dB in a low frequency band.

It should be understood that, in the antenna structure provided in this embodiment of this application, the second dielectric with a high DK value is configured to fill the slot formed between the radiator and the adjacent bezel, and the second dielectric filled in the slot may be equivalent to a distributed capacitor. After an antenna structure is filled with the dielectric with a high DK, improvement in radiation efficiency corresponding to the antenna structure may be understood as that ground excitation in the electronic device becomes relatively more sufficient, so that radiation efficiency of the antenna structure is improved.

In addition, in this embodiment of this application, for ease of comparison with a conventional antenna structure, the first dielectric and the second dielectric have a same DF value but different DK values. In actual production or design, the DF value or the DK value of the first dielectric and the second dielectric may be adjusted at the same time. This is not limited in this application.

In an embodiment, in the antenna structure shown in FIG. 12A, the second dielectric is filled at a tail end of the radiator (an end part at which the feed point is located may be considered as a head end), for example, on a side away from the feed point. If a position of the second dielectric is moved towards the feed point, radiation efficiency of the antenna structure is still higher than that in another conventional particle filling solution. However, compared with the position shown in FIG. 12A, the radiation efficiency is relatively reduced as the position of the second dielectric is moved towards the head end (the feed point).

FIG. 14A to FIG. 14D are schematic diagrams of a structure of an electronic device according to an embodiment of this application.

It should be understood that the ILA is configured as the antenna structure in the foregoing embodiments. The solution provided in this embodiment of this application may also be applied to another antenna form, for example, a closed slot antenna, as shown in FIG. 14A to FIG. 14D.

Figure 14A:
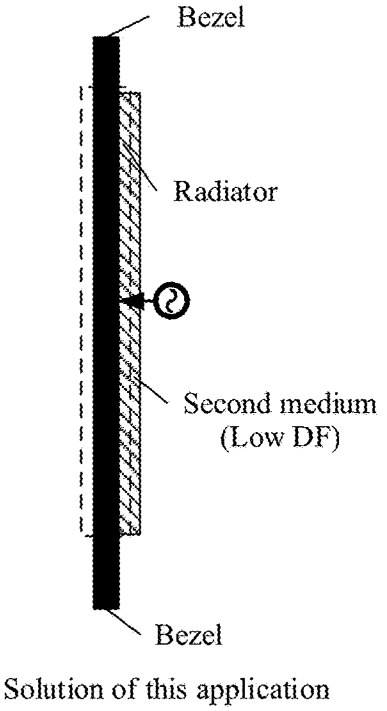
FIG. 14A to FIG. 14D are schematic diagrams of a structure of an electronic device according to an embodiment of this application.

According to the antenna structure provided in this embodiment of this application shown in FIG. 14A, the dielectric layer between the first position and the second position of the bezel may include only the second dielectric with a low DF value, a DF value of the second dielectric may be less than that of the first dielectric, and a DK value of the second dielectric may be the same as that of the first dielectric.

It should be understood that, according to the method provided in this embodiment of this application for performing secondary injection molding by using an NMT process to change a material of a dielectric layer corresponding to the antenna radiator, to improve radiation efficiency of the antenna structure, the dielectric layer may also be filled with the second dielectric with a low DF value.

Figure 15:
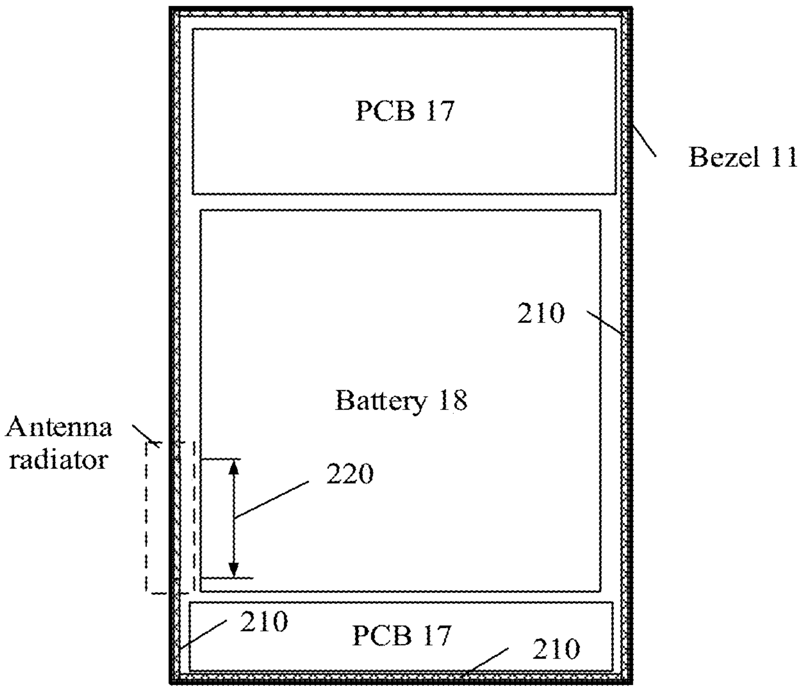
FIG. 15 is a schematic diagram of a structure of an electronic device according to an embodiment of this application.

As shown in FIG. 15, a dielectric layer may be disposed inside (near the PCB 17 or the battery 18) of the bezel 11, a dielectric layer between the first position and the second position of the bezel uses a second dielectric layer 220, and a remaining dielectric layer uses a first dielectric layer 210. Therefore, for the entire dielectric layer, secondary injection molding is performed on the second dielectric 220 to change a material of a dielectric layer corresponding to a radiator of the antenna structure, to improve radiation efficiency of the antenna structure.

In addition, in actual production or design, a region filled with the second dielectric 220 may be adjusted based on an actual situation, so that an area of the region filled with the second dielectric 220 is greater than or less than an area of the dielectric layer between the first position and the second position of the bezel. This is not limited in this application.

Figure 14B:
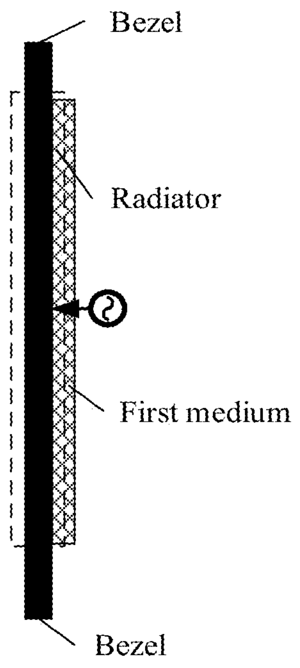

In the antenna structure shown in FIG. 14B, the dielectric layer corresponding to the radiator is a first dielectric layer. For example, the antenna structure is a closed slot antenna in an original state.

Figure 14C:
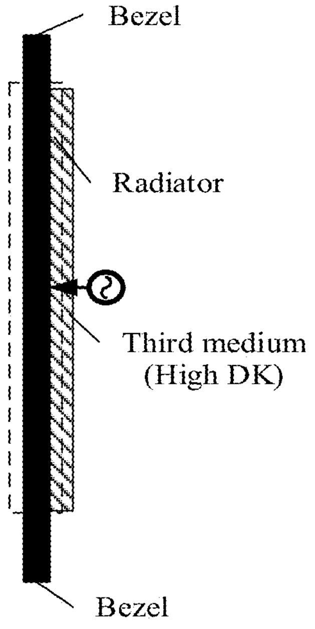

In the antenna structure shown in FIG. 14C, the dielectric layer corresponding to the radiator is a third dielectric layer, a DK value of a third dielectric included in the third dielectric layer may be greater than that of the first dielectric, and a DF value of the third dielectric may be the same as that of the first dielectric.

Figure 14D:
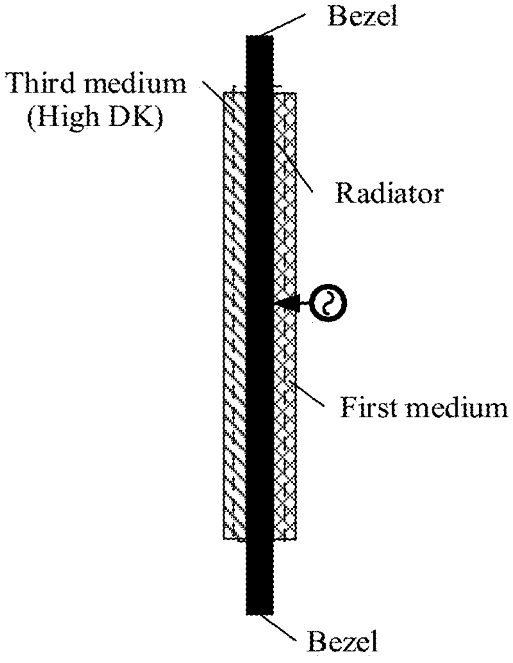

In the antenna structure shown in FIG. 14D, on the basis of the antenna structure shown in FIG. 14B, all of the outer surface of the radiator is covered with the third dielectric layer, the DK value of the third dielectric included in the third dielectric layer may be greater than that of the first dielectric, and the DF value of the third dielectric may be the same as that of the first dielectric.

Figure 16:
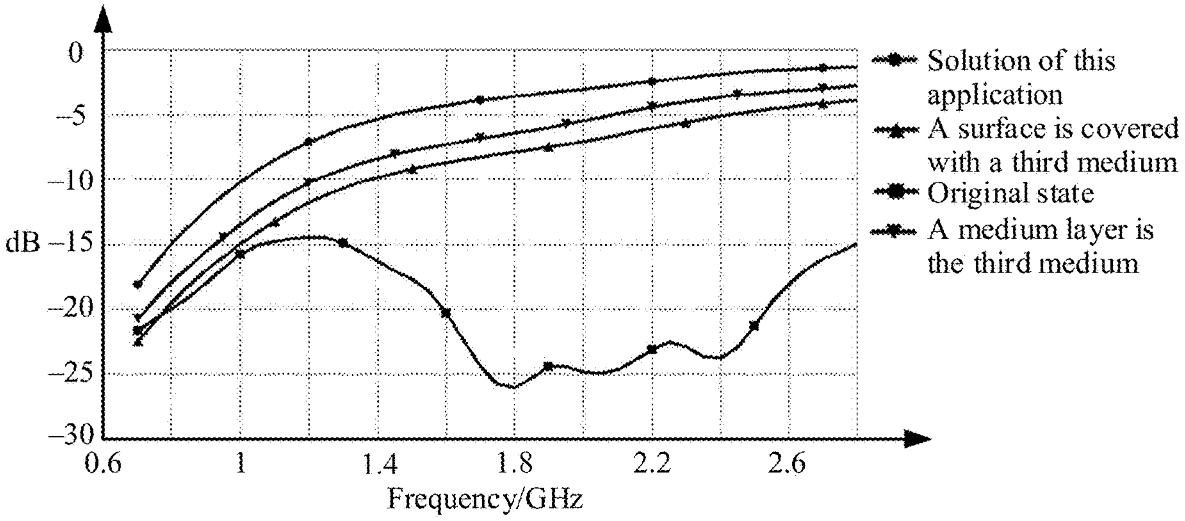
FIG. 16 is a schematic diagram of a simulation result of radiation efficiency of the antenna structure shown in FIG. 14A to FIG. 14D.

FIG. 16 is a schematic diagram of a simulation result of radiation efficiency of the antenna structure shown in FIG. 14A to FIG. 14D.

In this embodiment, the antenna structure may also work in a low frequency band, and a corresponding length of the radiator may be 41 mm. The DK value of the first dielectric may be 3.5, and the DF value of the first dielectric may be 0.015. The DK value of the second dielectric may be 3.5, and the DF value of the second dielectric may be 0.001. The DK value of the third dielectric may be 100, and the DF value of the third dielectric may be 0.015. It should be understood that the foregoing dielectric parameters are merely configured as examples. This is not limited in this embodiment of this application, and may be adjusted according to actual production or design.

A change is caconfigured to the antenna structure through the second injection molding of a dielectric different from the first dielectric. This causes significant a change to antenna efficiency of a same antenna design. FIG. 16 shows a comparison between efficiency of the antenna structure provided in this application and efficiency in a conventional design. It can be apparent from a result that radiation efficiency can be effectively improved by using the antenna structure provided in this application. It may be considered that a DF of a dielectric is reduced, and therefore a loss of plastic particles of the dielectric is reduced, so that efficiency is relatively improved.

In addition, the antenna structure shown in FIG. 14D may also improve radiation efficiency of the antenna. This efficiency improvement may be considered as an extension of an outer conductor of the closed slot antenna by using a dielectric with a high DK. In addition, the more the outer conductor extends outward, the more the radiation efficiency of the antenna is improved.

Figure 17A:
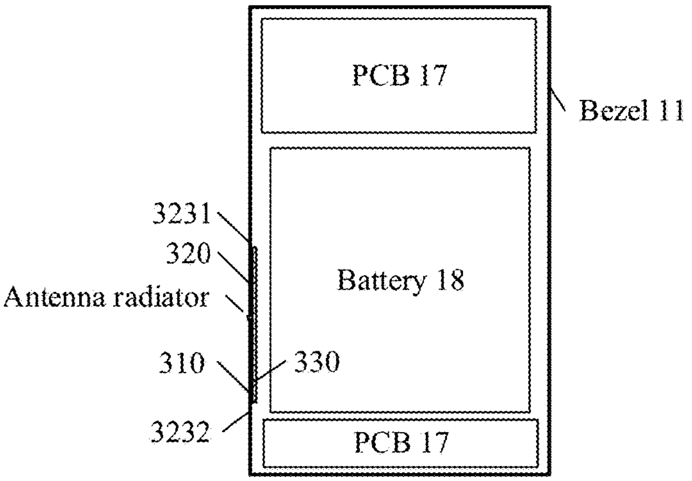
FIG. 17A and FIG. 17B are schematic diagrams of a structure of an electronic device according to an embodiment of this application.
Figure 17B:
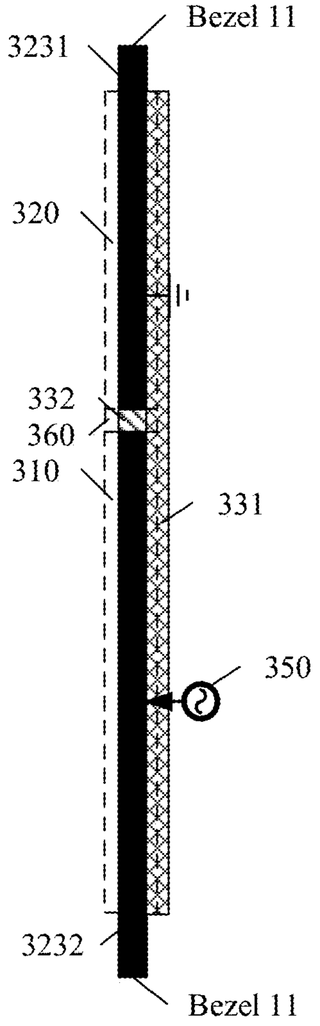

FIG. 17A and FIG. 17B are schematic diagrams of a structure of an electronic device according to an embodiment of this application.

As shown in FIG. 17A and FIG. 17B, the antenna radiator may include a first radiator 310, a second radiator 320, a dielectric layer 330, and a feed unit 350.

The first radiator 310 and the second radiator 320 may be disposed between a first position 3231 and a second position 3232 of the bezel 11, and a slot 360 is formed between the first radiator 310 and the second radiator 320. The slot 360 may be filled with a second dielectric 332. Another part of a dielectric layer between the first position 3231 and the second position 3232 of the bezel 11 may be filled with a first dielectric 331. A DK value of the second dielectric 332 is greater than that of the first dielectric 331. A feed point may be disposed on the first radiator 310, and the feed unit 350 may be electrically connected to the first radiator 310 at the feed point, to feed an antenna structure.

In an embodiment, a ground point may be disposed on the second radiator 320, and the second radiator 320 may be grounded at the ground point.

It should be understood that, in the antenna structure provided in this embodiment of this application, the first radiator 310 is configured as an exciting element, and the second radiator 320 is configured as a parasitic element. The second dielectric different from the first dielectric is injected into the slot 360 formed between the first radiator 310 and the second radiator 320 through second injection molding, which causes a significant change to antenna efficiency of a same antenna design.

Figure 18:
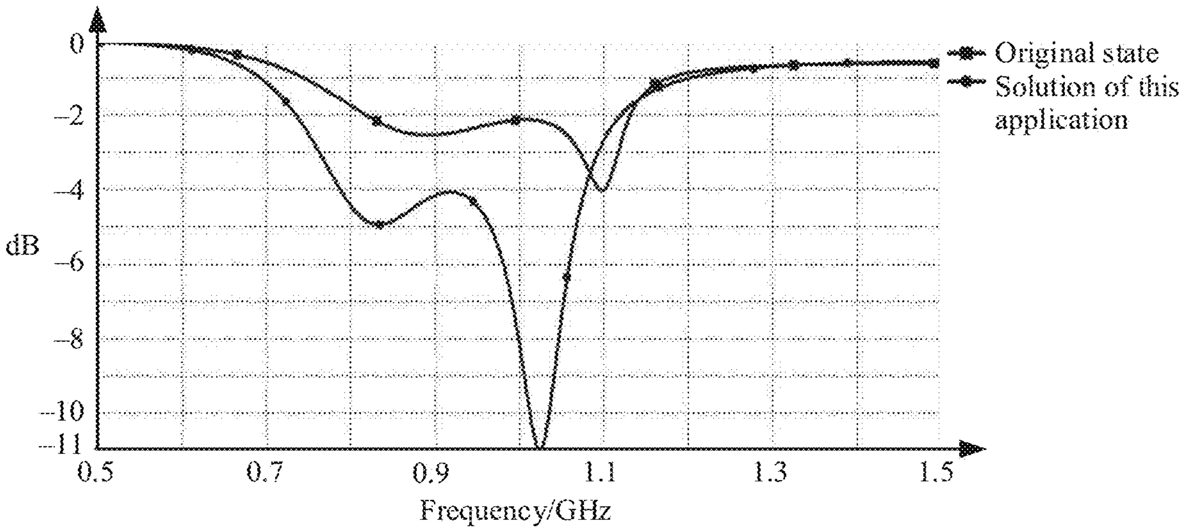
FIG. 18 is a schematic diagram of an S11 parameter simulation result of the antenna structure shown in FIG. 17A and FIG. 17B.
Figure 19:
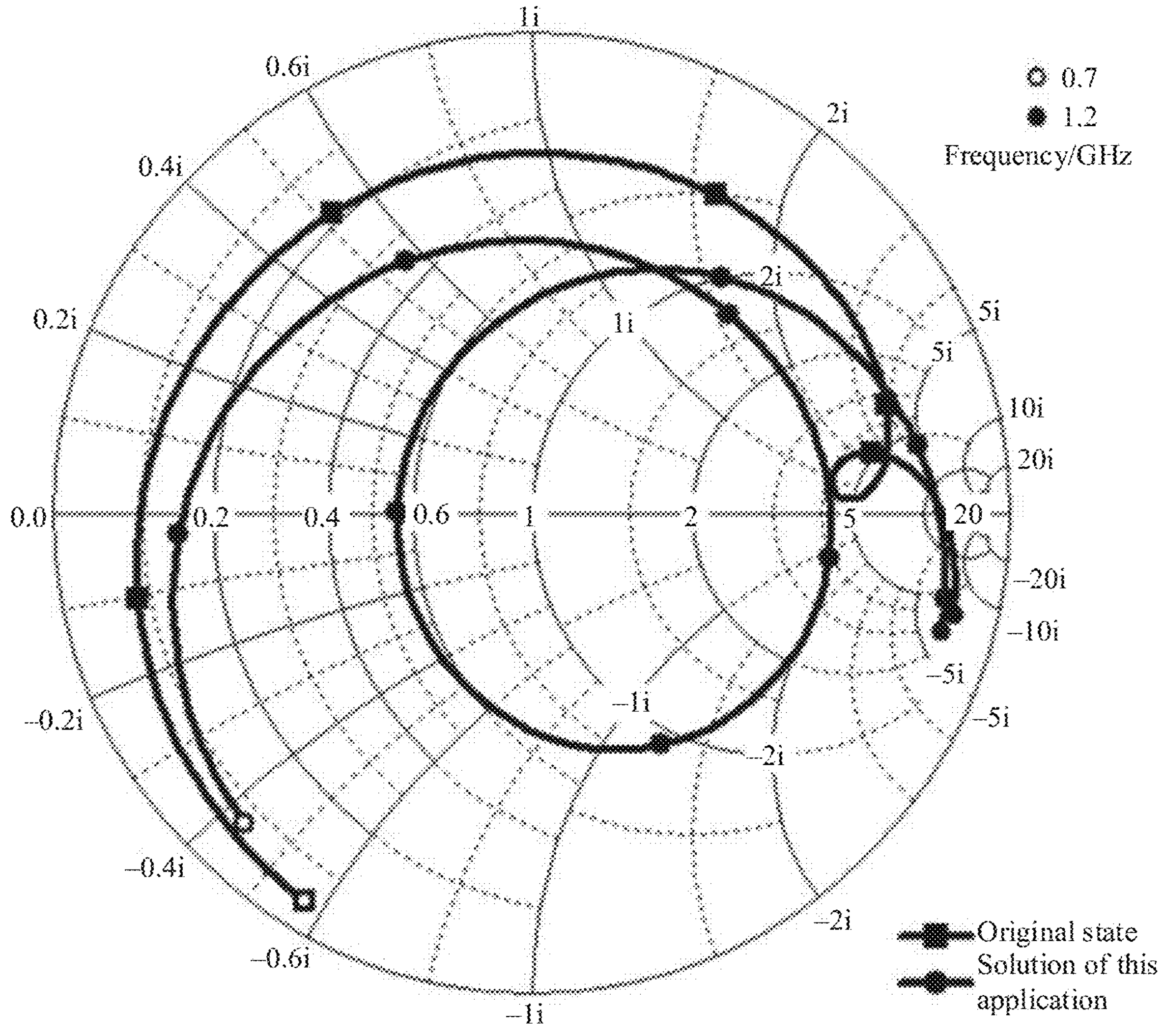
FIG. 19 is a schematic diagram of a Smith simulation result of the antenna structure shown in FIG. 17A and FIG. 17B.
Figure 20:
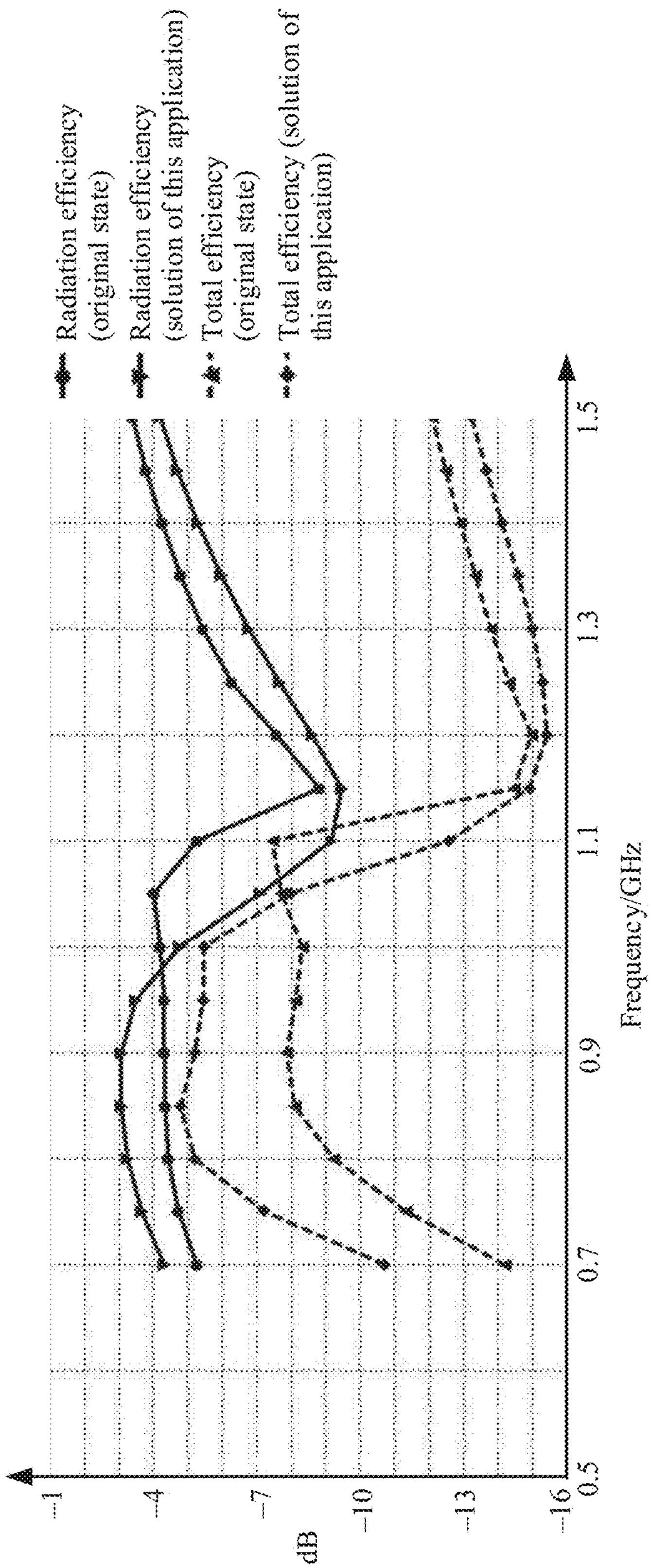
FIG. 20 is a schematic diagram of simulation results of radiation efficiency and total efficiency of the antenna structure shown in FIG. 17A and FIG. 17B.

FIG. 18 to FIG. 20 are schematic diagrams of a simulation result of the antenna structure shown in FIG. 17A and FIG. 17B. FIG. 18 is a schematic diagram of an S11 parameter simulation result of the antenna structure shown in FIG. 17A and FIG. 17B. FIG. 19 is a schematic diagram of a Smith simulation result of the antenna structure shown in FIG. 17A and FIG. 17B. FIG. 20 is a schematic diagram of simulation results of radiation efficiency and total efficiency of the antenna structure shown in FIG. 17A and FIG. 17B.

It should be understood that, in this embodiment of this application, an antenna structure (an original state) used for comparison is similar to the antenna structure in the embodiment of this application shown in FIG. 17A and FIG. 17B, and a difference lies in that the slot 360 formed between the first radiator and the second radiator is still filled with the first dielectric.

In this embodiment, a DK value of the first dielectric may be 3.5, and a DK value of the second dielectric may be 15. DF values of the first dielectric and the second dielectric may be the same, and both are 0.015. It should be understood that the foregoing dielectric parameters are merely configured as examples. This is not limited in this embodiment of this application, and may be adjusted according to actual production or design.

As shown in FIG. 18, when the feed unit performs feeding in the antenna structure, the exciting element and the parasitic element can respectively excite resonance near 800 MHz and 1100 MHz, which can meet a communication requirement. It should be understood that a dielectric parameter of the dielectric layer or a length of the radiator may be adjusted according to different design or production requirements, to change a resonance frequency generated by an antenna unit. This is not limited in this application.

As shown in FIG. 19 and FIG. 20, according to this application, secondary injection molding is performed by using an NMT process to change a material that is of a dielectric layer and that is filled in the slot formed between the first radiator and the second radiator of the antenna structure, for example, change a dielectric layer structure between the first position and the second position, specifically, change a dielectric parameter of a dielectric in the dielectric layer. A dielectric with a high DK value is filled in a slot between the exciting element and the parasitic element, so that coupling between resonance generated by the exciting element and resonance generated by the parasitic element is effectively improved, and antenna efficiency can be improved by about 3 dB in a low frequency band (700 MHz to 1000 MHz).

Figure 21A:
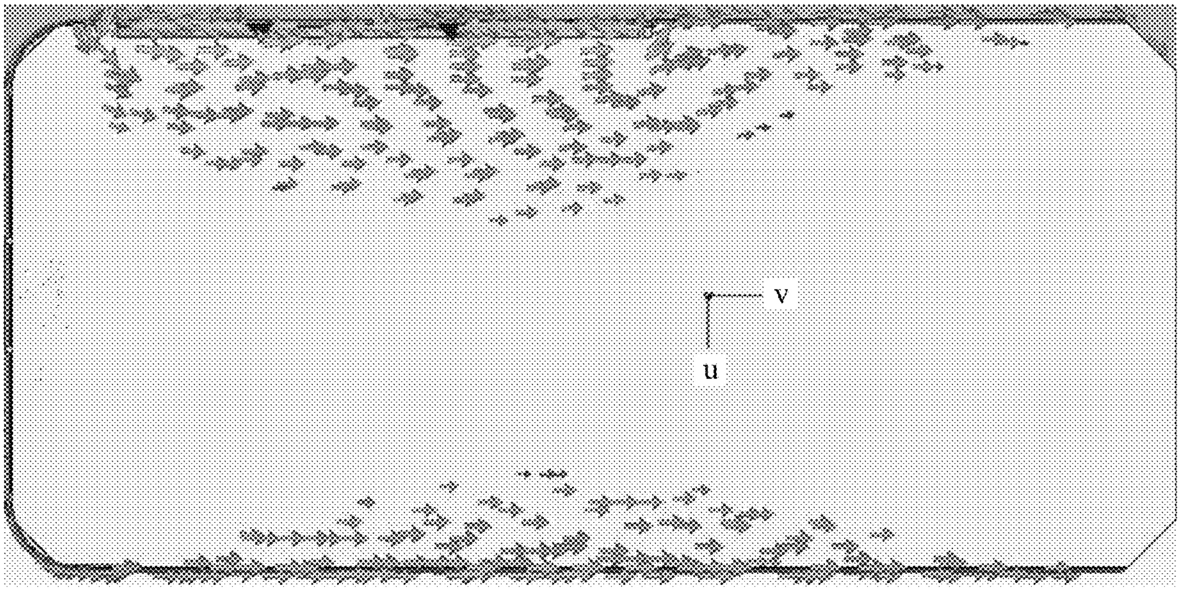
FIG. 21A and FIG. 21B are schematic diagrams of current distribution of the antenna structure shown in FIG. 17A and FIG. 17B.
Figure 21B:
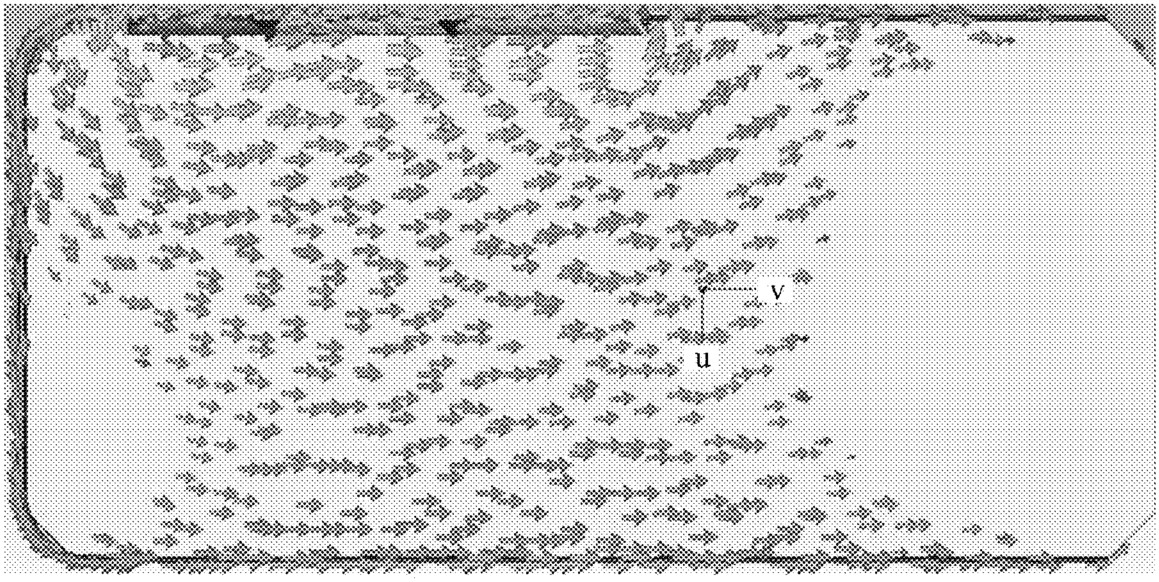

FIG. 21A and FIG. 21B are schematic diagrams of current distribution of the antenna structure shown in FIG. 17A and FIG. 17B.

FIG. 21A and FIG. 21B are distribution diagrams of currents of an antenna structure provided in an embodiment of this application and a compared antenna structure when the antenna structure is at 800 MHz.

When the feed unit performs feeding, a larger current is coupled from the exciting element to the parasitic unit. Therefore, current excitation of the ground of the electronic device is more sufficient, as shown in FIG. 21B, and radiation efficiency and total efficiency of the antenna structure is correspondingly improved.

In addition, in this embodiment of this application, for ease of comparison with a conventional antenna structure, the first dielectric and the second dielectric have a same DF value but different DK values. In actual production or design, the DF value or the DK value of the first dielectric and the second dielectric may be adjusted at the same time. This is not limited in this application.

Figure 22:
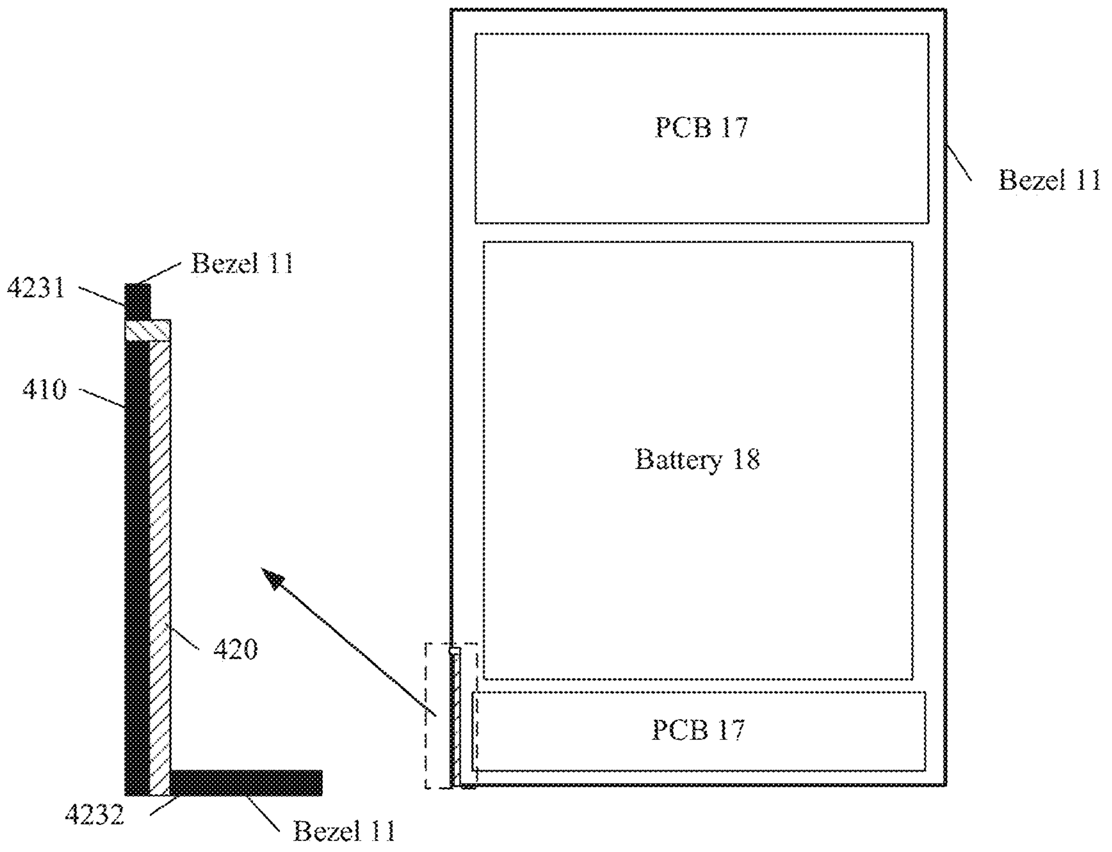
FIG. 22 is a schematic diagram of a structure of an electronic device according to an embodiment of this application.

FIG. 22 is a schematic diagram of a structure of an electronic device according to an embodiment of this application.

In an embodiment, a dielectric layer 420 between a first position 4231 and a second position 4232 may be filled with a magnetic dielectric.

It should be understood that parameters of a radio frequency attribute of materials corresponding to a magnetic dielectric and a dielectric are a relative permeability (relative permeability, μ) and a loss factor (μF). In a same antenna structure, using different dielectric materials as the dielectric layer has a great difference in antenna efficiency.

Figure 23:
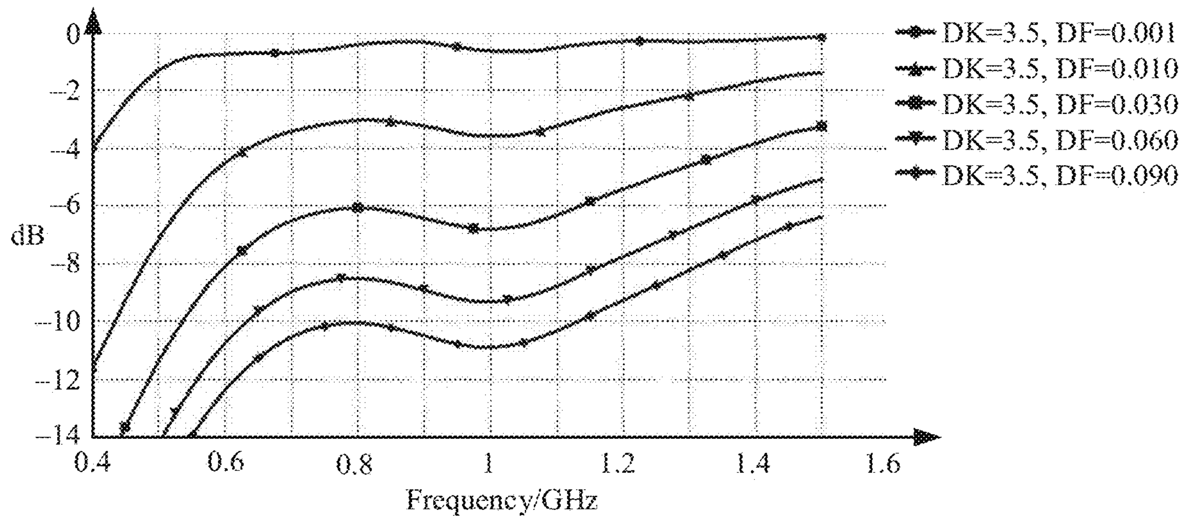
FIG. 23 is a schematic diagram of a simulation result of radiation efficiency of a dielectric with different DF values.
Figure 24:
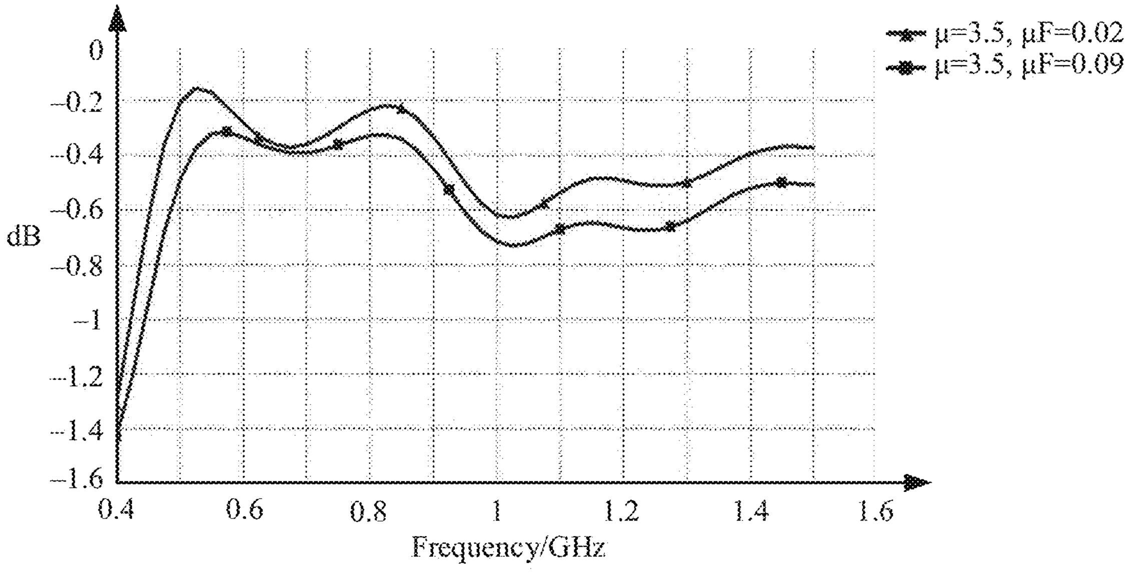
FIG. 24 is a schematic diagram of a simulation result of radiation efficiency of a magnetic dielectric with different loss factors.

FIG. 23 and FIG. 24 are schematic diagrams of a simulation result of radiation efficiency of a dielectric or a magnetic dielectric used at a dielectric layer in the antenna structure shown in FIG. 22. FIG. 23 is a schematic diagram of a simulation result of radiation efficiency of a dielectric with different DF values. FIG. 24 is a schematic diagram of a simulation result of radiation efficiency of a magnetic dielectric with different μF.

As shown in FIG. 23, when a DK value of a dielectric layer corresponding to an antenna radiator is fixed to 3.5, as a DF value increases, deterioration of radiation efficiency of the antenna structure becomes more obvious. This is because the DF is a loss value of a dielectric material. A larger DF value indicates a more obvious loss.

As shown in FIG. 24, for μ and μF of a magnetic dielectric material, when the μ value of the dielectric layer corresponding to the antenna radiator is fixed to 3.5, a change of g of the magnetic dielectric does not significantly deteriorate radiation efficiency of the antenna structure. Therefore, for a dielectric layer in a region corresponding to the antenna radiator, if a dielectric with a high DF value needs to be selected, a magnetic dielectric may be selected as a dielectric in a second injection molding process, so that better radiation efficiency can be obtained.

When the antenna structure is filled with particles of a high-loss magnetic material, radiation efficiency of the antenna is still high in a same antenna environment. Herein, it may be considered that the antenna structure provided in this embodiment of this application is an ILA. The ILA mainly couples energy to a ground of an electronic device by using a relatively concentrated electric field. When an electric field passes through the magnetic dielectric, the electric field is not affected. However, when the electric field passes through the dielectric, both the DK and the DF of the dielectric material weaken energy that is the electric field and that is coupled to the ground of the electronic device. Therefore, it can be seen from FIG. 23 that when a dielectric DF of the ILA increases, radiation efficiency of the antenna structure decreases very fast. However, it can be seen from FIG. 24 that when the g increases in an ILA solution, relative impact on the radiation efficiency of the antenna structure is small.

It should be understood that in the antenna structure provided in this embodiment of this application, another dielectric may be injected into a region of the dielectric layer corresponding to the radiator by using a secondary injection molding process, to change parameters of a dielectric layer corresponding to a radiator of the antenna structure at different positions, so that an antenna radiation characteristic can be changed, and antenna radiation efficiency can be improved.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:

a bezel comprising an inner surface, a first portion, a second portion, and a third portion located between the first portion and the second portion and configured as an antenna radiator, wherein the antenna radiator comprises a surface;

a first dielectric disposed on at least a part of the inner surface of the bezel besides the third portion; and a second dielectric disposed on at least a part of the surface of the antenna radiator, wherein at least one of a first dielectric constant or a first dissipation factor of the first dielectric is different from at least one of a second dielectric constant or a second dissipation factor of the second dielectric.

2. The electronic device of claim 1, further comprising a first slot formed between the first portion and the third portion of the bezel, wherein the first slot is filled with the second dielectric, and wherein the second dielectric constant is greater than the first dielectric constant.

3. The electronic device of claim 2, further comprising a second slot formed between the second portion and the third portion of the bezel, wherein the second slot is filled with the first dielectric.

4. The electronic device of claim 2, further comprising:

a feed point disposed on the antenna radiator; and a feed structure configured to feed the antenna radiator at the feed point, wherein a first distance between the feed point and the first portion of the bezel is greater than a second distance between the feed point and the second portion of the bezel.

5. The electronic device of claim 2, wherein dissipation factors of the first dielectric and the second dielectric are the same.

6. The electronic device of claim 2, wherein the first dissipation factor is less than the first dissipation factor.

7. The electronic device of claim 1, further comprising a first slot formed between the first portion and the third portion of the bezel, wherein the first slot is filled with the second dielectric, and wherein the second dielectric constant is less than the first dielectric constant.

8. The electronic device of claim 7, further comprising a second slot formed between the second portion and the third portion of the bezel, wherein the second slot is filled with the first dielectric.

9. The electronic device of claim 7, further comprising:

a feed point disposed on the antenna radiator; and a feed structure configured to feed the antenna radiator at the feed point, wherein a first distance between the feed point and the first portion of the bezel is greater than a second distance between the feed point and the second portion of the bezel.

10. The electronic device of claim 7, wherein dissipation factors of the first dielectric and the second dielectric are the same.

11. The electronic device of claim 7, wherein the second dissipation factor is less than the first dissipation factor.

12. The electronic device of claim 1, wherein the antenna radiator further comprises:

a first radiator; and a second radiator disposed opposite to the first radiator and configured to form a third slot, wherein the third slot is filled with the second dielectric, and wherein the second dielectric constant is greater than the first dielectric constant.

13. The electronic device of claim 1, further comprising a dielectric layer configured to fasten the antenna radiator to the electronic device.

14. The electronic device of claim 1, wherein the first dielectric constant is the same as the second dielectric constant, and wherein the second dissipation factor is less than the first dissipation factor.

15. The electronic device of claim 1, wherein at least a part of the surface of the antenna radiator is filled with the second dielectric, wherein the first dielectric is a dielectric medium, and wherein the second dielectric is a magnetic dielectric.

16. The electronic device of claim 1, wherein the second dielectric is disposed on at least a part of an inner surface of the antenna radiator.

17. The electronic device of claim 1, wherein the second dielectric is disposed on at least a part of an outer surface of the antenna radiator, and wherein the second dielectric constant is greater than the first dielectric constant.

18. The electronic device of claim 1, wherein the first dielectric forms a first dielectric layer having a first end, wherein the second dielectric forms a second dielectric layer having a second end, and wherein the first end is connected to the second end.

19. The electronic device of claim 1, wherein at least a part of the surface of the antenna radiator is filled with the second dielectric, wherein both the first dielectric and the second dielectric are dielectric medium, and wherein the second dielectric constant is greater than the first dielectric constant.

20. The electronic device of claim 1, further comprising:

a feed point disposed on the antenna radiator; and a feed structure configured to feed the antenna radiator at the feed point, wherein a first distance between the feed point and the first portion of the bezel is greater than a second distance between the feed point and the second portion of the bezel.

* * * * *